(12) United States Patent
Cooksey et al.

(10) Patent No.: US 12,429,412 B2
(45) Date of Patent: Sep. 30, 2025

(54) SERIAL FLOW CYTOMETER

(71) Applicant: Government of the United States of America, as represented by the Secretary of Commerce, Gaithersburg, MD (US)

(72) Inventors: Gregory Alan Cooksey, Gaithersburg, MD (US); Paul Nathan Patrone, Washington Grove, MD (US); Anthony Jose Kearsley, Hanover, MD (US)

(73) Assignee: Government of the United States of America, as represented by the Secretary of Commerce, Gaithersburg, MD (US)

( * ) Notice: Subject to any disclaimer, the term of this patent is extended or adjusted under 35 U.S.C. 154(b) by 1133 days.

(21) Appl. No.: 17/345,691

(22) Filed: Jun. 11, 2021

(65) Prior Publication Data

US 2021/0302300 A1 Sep. 30, 2021

Related U.S. Application Data

(63) Continuation-in-part of application No. 17/084,683, filed on Oct. 30, 2020, now Pat. No. 12,072,277, (Continued)

(51) Int. Cl.
*G01N 15/1404* (2024.01)
*G01N 15/14* (2024.01)
*G01N 15/1434* (2024.01)

(52) U.S. Cl.
CPC ..... *G01N 15/1404* (2013.01); *G01N 15/1436* (2013.01); *G01N 15/1484* (2013.01); *G01N 2015/1413* (2013.01)

(58) Field of Classification Search
CPC .......... G01N 15/1404; G01N 15/1436; G01N 15/1484; G01N 2015/1413; G01N 15/01;
(Continued)

(56) References Cited

U.S. PATENT DOCUMENTS 7,245,379 B2 7/2007 Schwabe
7,709,821 B2 5/2010 Casstevens et al.
(Continued)

OTHER PUBLICATIONS

Fiedler, B.L., et al., "Droplet microfluidic flow cytometer for sorting on transient cellular responses of genetically-encoded sensors", Analytical Chemistry, 2017, p. 711-719, vol. 89 No. 1.
(Continued)

*Primary Examiner* — Tarifur R Chowdhury
*Assistant Examiner* — Akbar H. Rizvi
(74) *Attorney, Agent, or Firm* — Office of Chief Counsel for National Institute of Standards and Technology

(57) ABSTRACT

Embodiments of the present invention described herein provide a device that can measure a single particle in flow several times along a microchannel with integrated waveguides that carry optical signals (e.g. excitation, emission, transmission, and scattered light) to and from measurement regions. Embodiments of the present invention used to perform multiple measurements of particles, such as microspheres or cells, traveling in a sample fluid through a microfluidic channel achieve lower uncertainties, discriminate complex samples, and account for sources of uncertainty that might be related to the shape, deformability, stability, or activity of objects in a liquid sample.

18 Claims, 15 Drawing Sheets

Related U.S. Application Data which is a continuation-in-part of application No. 15/967,966, filed on May 1, 2018, now Pat. No. 11,035,707.

(60) Provisional application No. 63/038,252, filed on Jun. 12, 2020, provisional application No. 62/576,709, filed on Oct. 25, 2017.

(58) Field of Classification Search
CPC ... G01N 2015/0053; G01N 2015/1006; G01N 15/1459
See application file for complete search history.

(56) References Cited

U.S. PATENT DOCUMENTS

| | | | |
|---|---|---|---|
| 8,101,426 B2 | 1/2012 | Durack et al. | |
| 8,717,569 B2 | 5/2014 | Lo et al. | |
| 2006/0219873 A1 | 10/2006 | Martin et al. | |
| 2010/0220315 A1* | 9/2010 | Morrell | G01N 15/1436 356/73 |
| 2012/0307244 A1* | 12/2012 | Sharpe | G01N 15/1459 250/573 |
| 2013/0037726 A1* | 2/2013 | Kiesel | G01N 21/6428 250/458.1 |
| 2015/0064694 A1* | 3/2015 | Sadri | B01L 3/502761 435/5 |
| 2016/0178518 A1* | 6/2016 | Schwabe | G01N 21/6428 422/82.08 |
| 2017/0248508 A1* | 8/2017 | Ward | G01N 33/5091 |
| 2019/0120673 A1 | 4/2019 | Cooksey et al. | |

OTHER PUBLICATIONS

Nolan, J.P., et al., "The emergence of flow cytometry for sensitive, real-time measurements of molecular Interactions", Nature Biotechnology, 1998, p. 633-638, vol. 16.

Blankenstein, G., et al., "Coaxial flow mixer forreal-time monitoring of cellular responses in flow injection cytometry", Cytometry, 1996, p. 200-204, vol. 25.

Meszaros, G., et al., "Kinetic Measurements Using Flow Cytometry: New Methods for Monitoring Intracellular Processes", Assay Drug Development Technologies, 2012, p. 97-104, vol. 10 No. 1.

Tung, Y-C., et al., "PDMS-based optofluidic micro flow cytometer with two-color multi-angle fluorescence detection capability using PIN photodiodes", Sensors and Actuators B, 2004, p. 356-367, vol. 98.

Pedrol, E., et al., "Optofluidic device for the quantification of circulating tumor cells in breast cancer", Scientific Reports, 2017, p. 3677, vol. 7.

Hur, S.C., et al., "Sheathless inertial cell ordering for extreme throughput flow cytometry", Lab on a Chip, 2010, p. 274-280, vol. 10.

Dicarlo, D., et al., "Dynamic Single cell analysis for quantitative biology", Analytical Chemistry, 2006, p. 7918-7925.

Gielen, F., et al., "Ultrahigh-throughput-directed enzyme evolution by absorbance-activated droplet sorting (AADS)", PNAS, 2016, E7383-E7389.

Chen, P., et al., "Dynamic Microfluidic Cytometry for Single-Cell Cellomics: High-Throughput Probing Single-Cell-Resolution Signaling", Analytical Chemistry, 2019, p. 1619-1626, vol. 91.

Chamoun, J., et al., "Optical calorimetry in microfluidic droplets", Lab on a Chip, 2018, p. 1581-1592, vol. 18.

Martini, J., et al., "Time encoded multicolor fluorescence detection in a microfluidic flow cytometer", Lab on a Chip, 2012, p. 5057-5062, vol. 12.

Ng, E.X., et a;l., "Ultrafast single-cell enzymatic tumor profiling", Analytical Chemistry, 2019, p. 1277-1285, vol. 91.

Sadeghi, J., et al., "Out-of-plan integration of a multimode optical fiber for single particle/cell detection at multiplepoints on a microfluidic device with applications to particle/cell counting, velocimetry, size discrimination and the analysis of single cell lysate injections", Lab on a Chip, 2017, p. 145-155, vol. 17.

Mckenna, B.K., et al., "A parallel microfluidic flow cytometer for high-content screening", Nature Methods, 2011, p. 401-406, vol. 8 No.5.

Holzner, G., et al., "An optofluidic system with integrated microlens arrays for parallel imaging flow cytometry", Lab on a Chip, 2018, p. 3631-3637, vol. 18.

Ross, D., et al., "Imaging of Electroosmotic Flow in Plastic Microchannels", Analytical Chemistry, 2001, p. 2509-2515, vol. 73 No.11.

Ahrens, M., et al., "Design and uncertainty assessment of a setup for calibration of microfluidic devices down to 5 nL min-1", Measurement Science and Technology, 2014, p. 015301, vol. 25.

Ahrens, M., et al., An experimental setup for traceable measurement and calibration of liquid flow rates down to 5nl/min, Biomed. Eng.-Biomed. Tech., 2015, p. 337-345, vol. 60 No. 4.

Hosseinkhannazer, H., et al., "Two-species microparticle detection in optofluidic biochips with polymeric waveguides", Proceedings of SPIE, 2008, p. 70990H-1, vol. 7099.

Lien, V., et al., "Microfluidic flow rate detection based on integrated optical fiber cantilever", Lab on a Chip, 2007, p. 1352-1356, vol. 7.

* cited by examiner (A)

(B)

(C)

(A)

(B)

(C)

SERIAL FLOW CYTOMETER

CROSS REFERENCE TO RELATED APPLICATIONS

This application claims the benefit of priority from U.S. Provisional Patent Application Ser. No. 63/038,252, filed on Jun. 12, 2020, and is also a continuation-in-part of, and claims the benefit of priority from, U.S. patent application Ser. No. 17/084,683, filed on Oct. 30, 2020, which claims the benefit of priority from U.S. patent application Ser. No. 15/967,966, filed on May 1, 2018, which claims the benefit of U.S. Provisional Patent Application Ser. No. 62/576,709, filed on Oct. 25, 2017, the disclosures of each of which are incorporated herein by reference in their entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, MD, 20899; voice (301) 301-975-2573; email tpo@nist.gov; reference NIST Docket Number 20-043US1.

BRIEF DESCRIPTION

Embodiments of the present invention relate to a flow cytometer, including: a substrate; a fluid inlet configured to receive a sample fluid including a plurality of particles; a first microchannel disposed on the substrate, wherein the first microchannel is configured to receive the sample fluid including the plurality of particles from the fluid inlet; a fluid outlet configured to allow the sample fluid to exit the substrate; a second microchannel disposed on the substrate in a plane parallel to a plane of the first microchannel such that a proximal end of the second microchannel aligns with a distal end of the first microchannel, wherein the second microchannel receives the sample fluid including the plurality of particles from the first microchannel, wherein the second microchannel is configured to convey the sample fluid received from the first microchannel to the fluid outlet; a plurality of fluid focusing microchannels intersecting the second microchannel, wherein each of the plurality of fluid focusing microchannels conveys a focusing fluid to the second microchannel such that the plurality of particles in the sample fluid is focused to form a substantially axially aligned particle stream; and a plurality of measurement regions configured to detect at least one of the plurality of particles being conveyed in the second microchannel, wherein each of the plurality of measurement regions includes: an interrogation region positioned downstream from the plurality of fluid focusing microchannels, wherein the interrogation region receives at least one of the plurality of particles conveyed in the substantially axially aligned particle stream in the focused sample fluid; an input light path disposed in the substrate to propagate an excitation light to the interrogation region, wherein the excitation light interacts with the at least one of the plurality of particles received in the interrogation region to produce an output light; and a first light collection path to propagate the output light from the interrogation region to a first optical detector, wherein the first light collection path is positioned at an oblique angle or right angle to the second microchannel and proximate to the interrogation region. More particularly, the excitation light is amplitude modulated and the first output light further includes emitted light, scattered light, transmitted light, or a combination including at least one of the foregoing types of light.

In one embodiment of the present invention, each of the plurality of measurement regions further includes: a second light collection path to propagate the output light from the interrogation region to a second optical detector, wherein the second light collection path is positioned above the input light path and at an oblique angle or right angle to the second microchannel and proximate to the interrogation region; and a third light collection path to propagate the output light from the interrogation region to a third optical detector, wherein the third light collection path is positioned below the input light path and at an oblique angle or right angle to the second microchannel and proximate to the interrogation region.

In another embodiment of the present invention, the first optical detector is positioned perpendicular to an axis traversing the substrate, and a detecting surface of the first optical detector is positioned opposing a first surface of the substrate. In some embodiments, a mirror is positioned perpendicular to the axis traversing the substrate, wherein the mirror is positioned opposing a second surface of the substrate, and a second optical detector is positioned perpendicular to the axis traversing the substrate, wherein a detecting surface of the second optical detector is positioned opposing a second surface of the substrate.

Some embodiments of the present invention further includes a flow controller in fluid communication with the fluid inlet and the plurality of fluid focusing microchannels, wherein the fluid controller controls the flow rate of the sample fluid to the fluid inlet, and wherein the fluid controller controls the flow rate of focusing fluid in the fluid focusing microchannels.

In some aspects of the present invention, each of the plurality of fluid focusing microchannels forms a fluid focusing region in the second microchannel, and wherein each of the fluid focusing regions is configured to focus the sample fluid into a stream in one of a first vertical direction, a second vertical direction, and at least one horizontal direction. More particularly, focusing of the sample fluid stream in the first vertical direction includes pushing the sample fluid in an upward direction, wherein the focusing of the sample fluid in the second vertical direction includes pushing the sample fluid in a downward direction to position the sample fluid at about the center of the second microchannel, and wherein the focusing of the sample fluid in the at least one horizontal direction includes pushing the sample fluid away from at least one sidewall of the second microchannel.

In another aspect of the present invention, the first, second and third light collection paths of the plurality of measurement regions is positioned symmetrically about a plane traversing the interrogation region of each of the plurality of measurement regions. In one embodiment, the input light path and the first, second and third light collection paths independently include a waveguide.

Some embodiments of the present invention further include a collimating optical element arranged to project uniform light into the interrogation region; and an optical filter optically interposed between each of the first, second and third light collection paths and each of the first, second and third optical detector.

Some embodiments of the present invention further include an analyzing module configured to extract a three-dimensional morphology parameter of each of the plurality of particles from a spatially coherent distribution of the output light received by the first, second and third optical detectors.

Another embodiment of the present invention relates to a flow cytometer, including: a substrate; a fluid inlet configured to receive a sample fluid including the plurality of particles; a first microchannel disposed on the substrate, wherein the first microchannel is configured to receive the sample fluid including the plurality of particles from the fluid inlet: a fluid outlet configured to allow the sample fluid to exit the substrate; and a second microchannel disposed on the substrate in a plane parallel to a plane of the first microchannel such that a proximal end of the second microchannel aligns with a distal end of the first microchannel, wherein the second microchannel receives the sample fluid including the plurality of particles from the first microchannel, wherein the second microchannel is configured to convey the sample fluid received from the first microchannel to the fluid outlet; a first, second and third fluid focusing microchannels positioned to intersect the second microchannel at an oblique angle, wherein the first fluid focusing microchannel is positioned in a plane that is substantially in the plane of and at the proximal end of the second microchannel, wherein the second fluid focusing microchannel is positioned in a plane that is above the plane of the second microchannel, wherein the third fluid focusing microchannel is positioned in a plane that is substantially in the plane of the second microchannel, wherein each of the first, second and third fluid focusing microchannels forms a fluid focusing region at the second microchannel such that each of the fluid focusing region includes a vertical fluid focusing feature or a horizontal fluid focusing feature configured to focus the sample fluid to an inertial node within the second microchannel; a plurality of measurement regions configured to detect at least one of the plurality of particles being conveyed in the second microchannel, wherein each of the plurality of measurement regions includes: an interrogation region positioned downstream from the plurality of fluid focusing microchannels, wherein the interrogation region receives at least one of the plurality of particles conveyed in the focused sample fluid; and an input light path disposed in the substrate to propagate an excitation light to the interrogation region, wherein the excitation light interacts with the at least one of the plurality of particles received in the interrogation region to produce an output light; a first optical detector positioned opposing a first surface of the substrate, wherein the first optical detector receives the output light exiting from the first surface of the substrate; and a mirror positioned opposing a second surface of the substrate such that the substrate is arranged between the mirror and the first optical detector, wherein the mirror reflects the output light exiting from the second surface of the substrate, and wherein the first optical detector receives the reflected output light. In one embodiment, each of the input light path and the first, second and third light collection paths includes a waveguide.

Some embodiments of the present invention further include a flow controller in fluid communication with the fluid inlet and the plurality of fluid focusing microchannels, wherein the fluid controller controls the flow rate of the sample fluid to the fluid inlet, and wherein the fluid controller controls the flow rate of focusing fluid in the fluid focusing microchannels.

In one embodiment of the present invention, the fluid focusing regions formed by the first and the second fluid focusing microchannels comprise the vertical feature, wherein the fluid focusing region formed by the third fluid focusing microchannel comprises the horizontal feature, wherein the first fluid focusing microchannel is positioned between the fluid inlet and the third fluid focusing microchannel, wherein the third fluid focusing microchannel is positioned between the first fluid focusing microchannel and the second fluid focusing microchannel, and the second fluid focusing microchannel is positioned between the third fluid focusing microchannel and the measurement region.

In another embodiment of the present invention, the fluid focusing regions formed by the first and the second fluid focusing microchannels comprise the vertical feature, wherein the fluid focusing region formed by the third fluid focusing microchannel comprises the horizontal feature, wherein the first fluid focusing microchannel is positioned between the fluid inlet and the second fluid focusing microchannel, wherein the second fluid focusing microchannel is positioned between the first fluid focusing microchannel and the third fluid focusing microchannel, and the third fluid focusing microchannel is positioned between the second fluid focusing microchannel and the measurement region.

Embodiments of the present invention also relate to a flow cytometer, including: a substrate; a fluid inlet configured to receive a sample fluid including the plurality of particles; a first microchannel disposed on the substrate, wherein the first microchannel is configured to receive a sample fluid including a plurality of particles from the fluid inlet; a fluid outlet configured to allow the sample fluid to exit the substrate; a second microchannel disposed on the substrate in a plane parallel to a plane of the first microchannel such that a proximal end of the second microchannel aligns with a distal end of the first microchannel, wherein the second microchannel is configured to convey the sample fluid from the first microchannel to the fluid outlet; a first, second and third fluid focusing microchannels positioned at an angle to the second microchannel, wherein the first fluid focusing microchannel is positioned between the fluid inlet and the second fluid focusing microchannel in a plane that is substantially in a plane of the second microchannel, wherein the second fluid focusing microchannel is positioned between the first fluid focusing microchannel and the third fluid focusing microchannel in a plane that is parallel to the plane of the first microchannel, wherein the third fluid focusing microchannel is positioned between the second fluid focusing microchannel and the measurement region in a plane that is substantially in the plane of the second microchannel, wherein each of the first, second and third fluid focusing microchannels is configured to convey focusing fluid therethrough, wherein focusing fluid in the first fluid focusing microchannels push the sample fluid in a first vertical direction to focus the sample fluid into a stream positioned along a top wall of the second microchannel, wherein focusing fluid in the second fluid focusing microchannels push the focused sample fluid stream in a second vertical direction to position the focused sample fluid stream at about the center of the second microchannel, and wherein focusing fluid in the third fluid focusing microchannels push the sample fluid in a horizontal direction away from at least one sidewall of the second microchannel; a plurality of measurement regions configured to detect at least one of the plurality of particles being conveyed in the second microchannel, wherein each of the plurality of measurement regions includes: an interrogation region positioned downstream from the plurality of fluid focusing microchannels, wherein the interrogation region receives at least one of the plurality of particles conveyed in the focused sample fluid; and an input light path disposed in the substrate to propagate an excitation light to the interrogation region, wherein the excitation light interacts with the at least one of the plurality of particles received in the interrogation region to produce an output light; a first optical detector is positioned opposing a first surface of the substrate, wherein the first optical detector receives the output light exiting from the first surface; and a second optical detector positioned opposing a second surface of the substrate such that the substrate is arranged between the first and second optical detectors, wherein the second optical detector receives the output light exiting from the second surface of the substrate.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

Conventional flow cytometers capable of measuring several single cells per second are limited in their ability to quantify uncertainty in individual measurements. This limitation reduces a flow cytometer's effectiveness to characterize biomarker distributions, discriminate cell populations, and detect rare events. Measurements in conventional flow cytometry systems are not repeated; thus, uncertainties in single measurements are undefined. Overall, this significantly limits object classification and discrimination of events that are rarer than about 1 in 10,000. These limitations also make it challenging to compare measurements between laboratories. Accordingly, there is a need for a microfluidic flow cytometer that is capable of robust and repeated measurements with well-defined measurement uncertainty. There is also a need in basic and clinical medical research of making accurate measurements of objects in flow, an example of which would be to characterize a sample containing fluorescently labeled cancer cells.

Embodiments of the present invention described herein provide a device that can measure a single particle in flow several times along a microchannel with integrated waveguides that carry optical signals (e.g. excitation, emission, transmission, and scattered light) to and from measurement regions. Embodiments of the present invention perform multiple measurements of particles, such as microspheres or cells, traveling in a sample fluid through a microfluidic channel. These embodiments achieve lower uncertainties, discriminate complex samples, and account for sources of uncertainty that might be related to the shape, deformability, stability, or activity of objects in a liquid sample.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
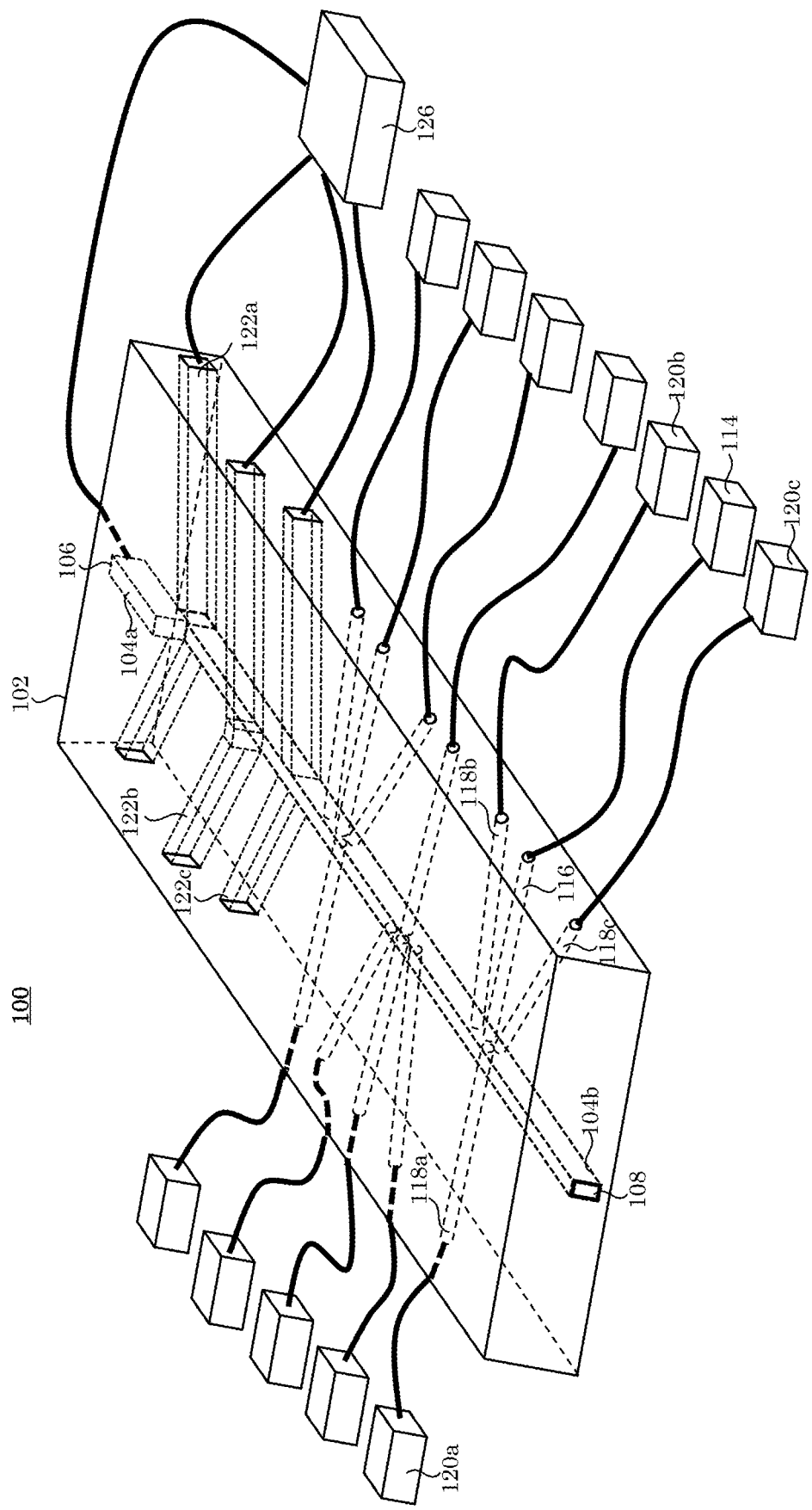
FIG. 1 shows a perspective view of an exemplary flow cytometer in accordance with the present invention.
Figure 2:
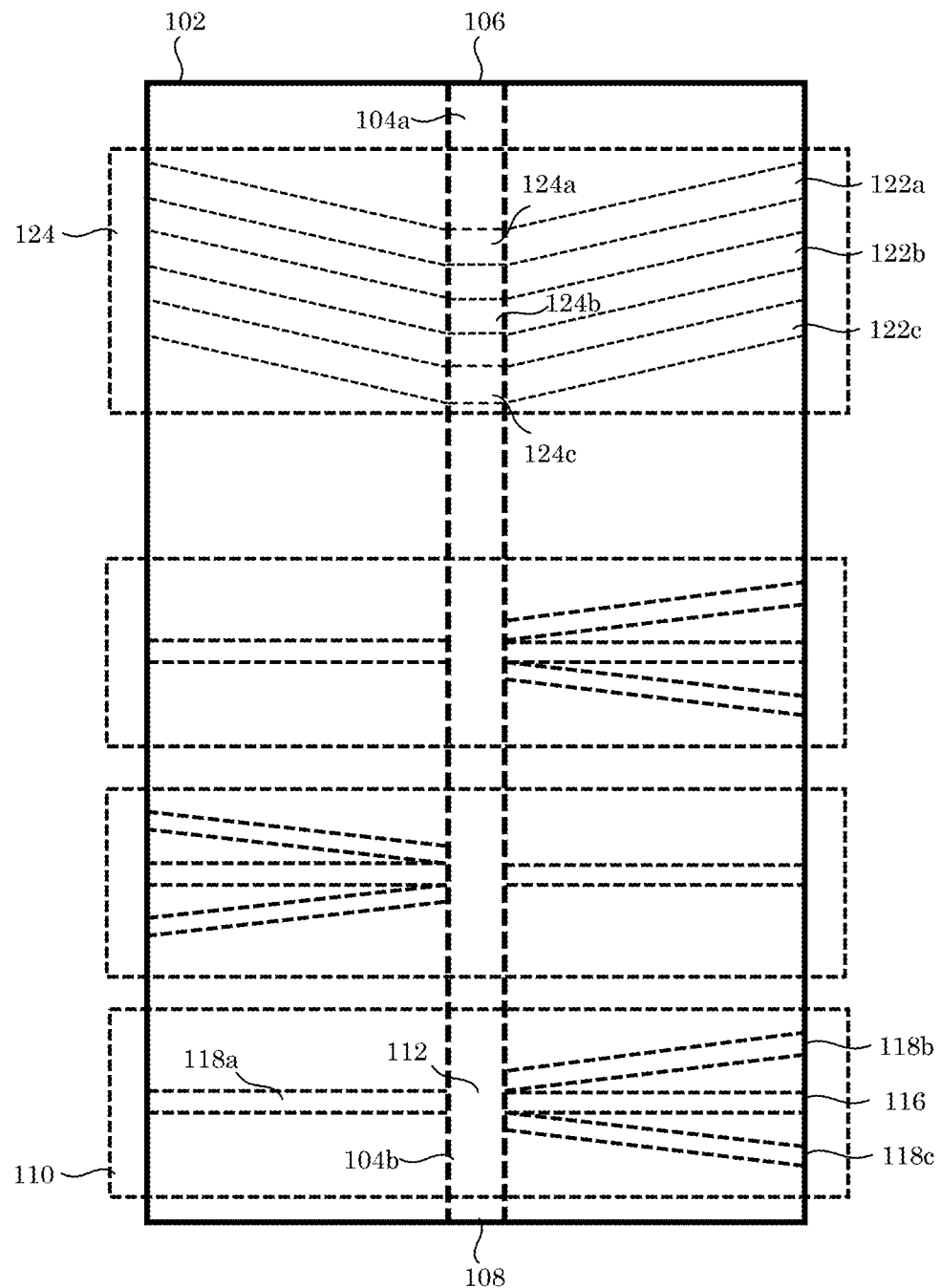
FIG. 2 shows a cross-sectional view of flow cytometer shown in FIG. 1.
Figure 3:
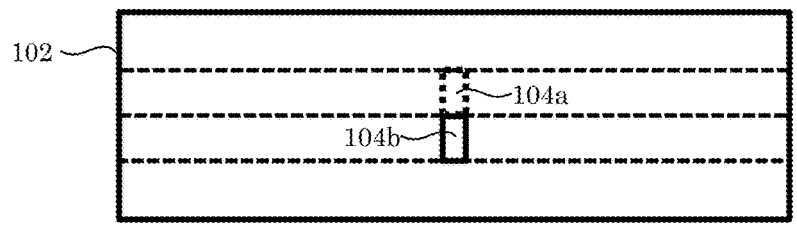
FIG. 3 shows: (A) an end view, (B) a first side view and (C) a second side view of flow cytometer shown in FIG. 1.
Figure 3:
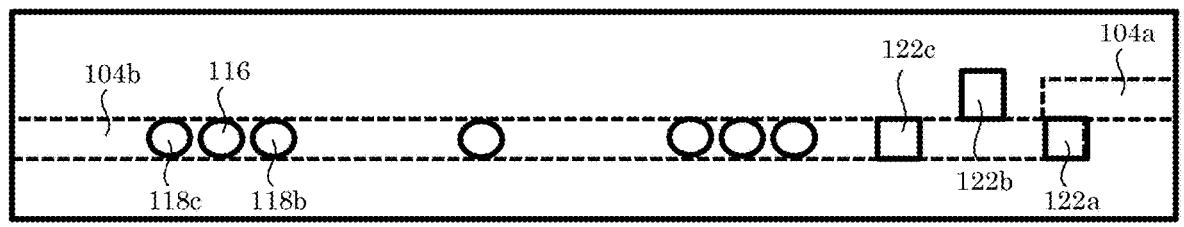
Figure 3:
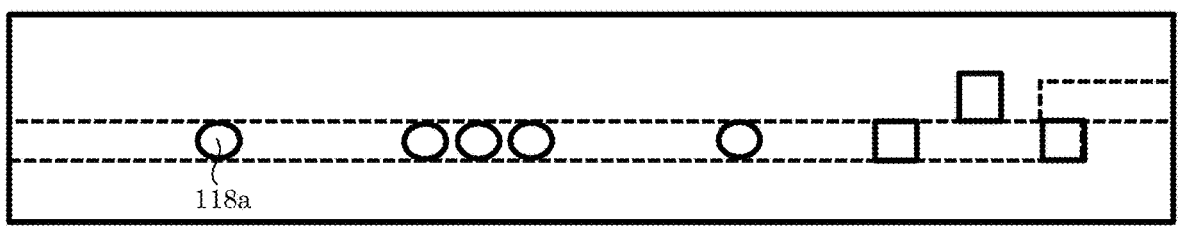

Referring now to the drawings, and more particularly, to FIGS. 1, 2 and 3, there is shown a flow cytometer, generally designated 100 and schematically showing an embodiment of the present invention, for performing multiple measurements of a particle in a sample fluid transported through a microfluidic channel. Flow cytometer 100 includes substrate 102 and microchannels 104a-b that is formed in the body portion of substrate 102 for transporting liquid therethrough, fluid inlet 106 that receives sample fluid including particles, fluid outlet 108 through which sample fluid exits from microchannel 104b. Microchannels 104a-b are disposed in and bound by substrate 102 and are interposed between fluid inlet 106 and fluid outlet 108 to provide a flow channel for conveying sample fluid from fluid inlet 106 to fluid outlet 108. Microchannels 104b is positioned in a plane parallel to and below a plane of microchannel 104a such that a proximal end of microchannel 104b aligns with a distal end of microchannel 104a. In one embodiment of the present invention, microchannel 104b is positioned such that a plane traversing the bottom of microchannel 104a is parallel to and aligns with a plane traversing the top of microchannel 104b. Microchannel 104b provides a flow channel configured to entrain particles in the sample fluid stream with sufficient focus, alignment, and spacing to allow repeated analysis of each particle.

Flow cytometer 100 includes fluid focusing microchannels 122a-c, as further shown in FIGS. 1-4, in communication with microchannels 104a-b to hydrodynamically focus the sample fluid to a spatially confined stream such that the particles in the sample fluid pass in a substantially single file or axially aligned manner through optical interrogation region 112 in microchannel 104b. Hydrodynamic focusing of the sample fluid is achieved by flowing a focusing fluid at a predetermined flow rate around the sample fluid to form a sheath surrounding the particle in the sample fluid. In one embodiment of the present invention, hydrodynamic focusing of the sample fluid within microchannel 104b is used to set the sample fluid to a specific size and position in the cross section of the microchannel 104b at an optical interrogation region 112. In another embodiment of the present invention, hydrodynamic focusing of the sample fluid within microchannel 104b is used to position particles at an inertial focusing node within optical interrogation region 112 of microchannel 104b and enable the analysis of the particles in the sample fluid with uniformity and repeatability.

Fluid focusing microchannels 122a-c are positioned to intersect microchannels 104b at an oblique angle or right angle to provide focusing fluid from each of fluid focusing microchannels 122a-c to microchannel 104b. Fluid focusing region 124, which includes fluid focusing regions 124a-c, is formed in microchannel 104b at the intersection of each of microchannels 122a-c with microchannel 104b to focus the sample fluid stream. Focusing fluid flowing from each of fluid focusing microchannels 122a-c to microchannel 104b will result in fluid focusing regions 124a-c having a vertical fluid focusing feature and a horizontal fluid focusing feature. As used herein, "vertical" may refer to a direction extending generally out of the plane of substrate 102 and "horizontal" may refer to a direction extending in the plane of substrate 102. Embodiments of the present invention may further include a focusing feature due to inertial effects in microchannel 104b.

Figure 4:
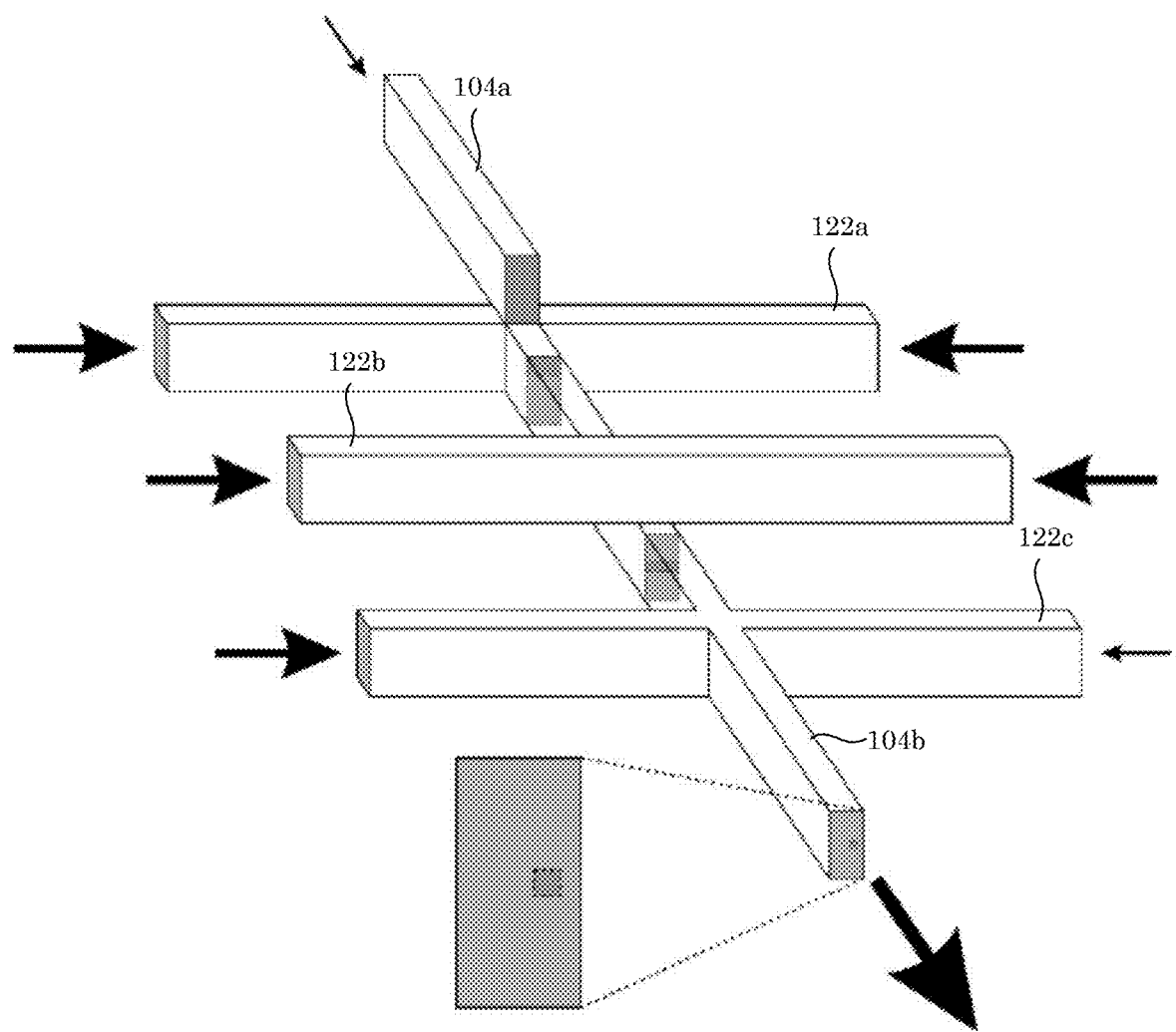
FIG. 4 illustrates a flow focusing microchannel system used in flow cytometer shown in FIG. 1.
Figure 5:
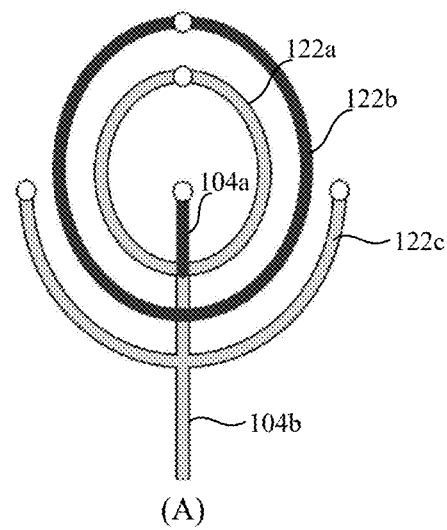
FIG. 5 illustrates alternate arrangements of flow focusing microchannel system used in flow cytometer shown in FIG. 1.
Figure 5:
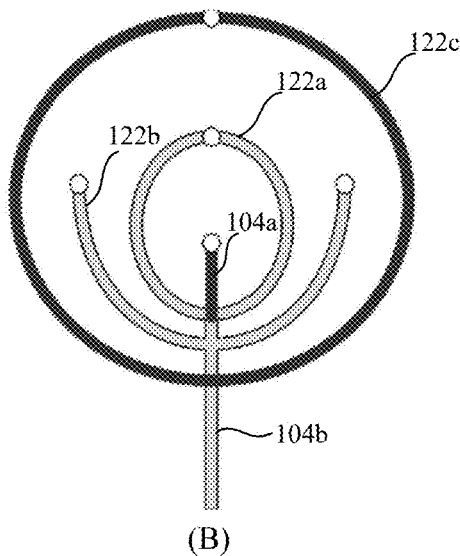
Figure 5:
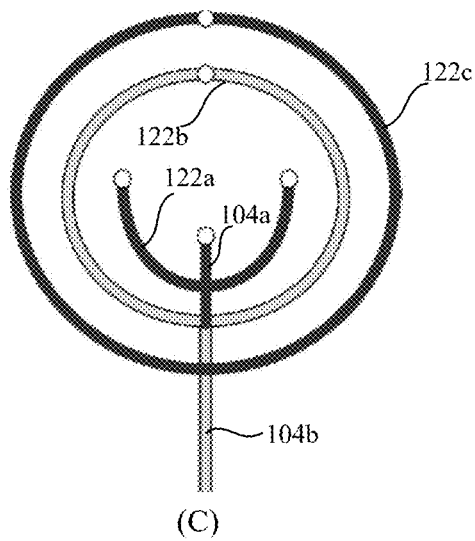

In the embodiments shown in FIGS. 1-4, hydrodynamic focusing is created by focusing fluid flowing from fluid focusing microchannels 122a-c positioned at an angle to microchannel 104b and positioned on two sides of microchannel 104b. Fluid focusing microchannel 122a is positioned below the plane of microchannel 104a and on the same plane as microchannel 104b to form a fluid focusing region 124a at the intersection of fluid focusing microchannels 122a and microchannel 104b. Sample fluid flowing through microchannel 104a drops into fluid focusing region 124a and focusing fluid flowing from microchannel 122a enters microchannel 104b and positions the sample fluid stream toward the top of fluid focusing region 124a such that the sample fluid is focused to a stream along the top wall of microchannel 104b. Fluid focusing microchannel 122b is positioned downstream from fluid focusing microchannel 122a and above the plane of microchannel 104b to form a fluid focusing region 124b in microchannel 104b and at the intersection of fluid focusing microchannels 122b and microchannel 104b. Focusing fluid flowing from microchannel 122b enters from top of microchannel 104b at fluid focusing region 124b and push the focused sample fluid stream from fluid focusing region 124a downward such that the sample fluid stream is positioned at about the center of microchannel 104b. Fluid focusing microchannel 122c is positioned downstream from fluid focusing microchannel 122b and along the plane of microchannel 104b to form a fluid focusing region 124c in microchannel 104b and at the intersection of fluid focusing microchannels 122c and microchannel 104b. Focusing fluid in microchannel 122c enters microchannel 104b at fluid focusing region 124c and pushes the focused sample fluid stream from fluid focusing region 124b away from at least one sidewall of microchannel 104b, as shown in FIG. 4. If inertial focusing effects are substantial, biasing the flow past the horizontal centerline will be sufficient to direct particles to a single inertial position if measurement region 110 is positioned sufficiently far downstream. Thus, flow into one of the focusing microchannels 122c can be set to zero. FIG. 5(A) provides an alternative perspective of arrangement of fluid focusing microchannel 122a-c in the embodiment shown in FIGS. 1-4. In some embodiments of the present invention, focusing microchannels 122a-c are positioned upstream from the intersection of microchannel 104a and microchannel 104b such that at least one of fluid focusing microchannels 122a-c intersects microchannel 104a.

FIGS. 5(B) and 5(C) illustrates alternate arrangements of fluid focusing microchannels 122a-c positioned to intersect microchannel 104b with each arrangement including a single channel for the sample fluid. In one embodiment of the present invention, as shown in FIG. 5(B), fluid focusing microchannels 122a is positioned below the plane of microchannel 104a and on the same plane as microchannel 104b to form a fluid focusing region 124a at the intersection of fluid focusing microchannels 122a and microchannel 104b. Sample fluid flowing through microchannel 104a drops into fluid focusing region 124a and focusing fluid flowing from microchannel 122a enters microchannel 104b and pushes the sample fluid stream toward the top of fluid focusing region 124a such that the sample fluid is focused to a stream along the top wall of microchannel 104b. Fluid focusing microchannel 122b is positioned downstream from fluid focusing microchannel 122a and along the plane of microchannel 104b to form a fluid focusing region 124b in microchannel 104b and at the intersection of fluid focusing microchannels 122b and microchannel 104b. Focusing fluid in microchannel 122b enters microchannel 104b at fluid focusing region 124b and pushes the focused sample fluid stream from fluid focusing region 124a away from at least one sidewall of microchannel 104b. If inertial focusing effects are substantial, biasing the flow past the horizontal centerline will be sufficient to direct particles to a single inertial position if measurement region 110 is positioned sufficiently far downstream. Thus, flow into one of the focusing microchannels 122c can be set to zero. Fluid focusing microchannel 122c is positioned downstream from fluid focusing microchannel 122b and above the plane of microchannel 104b to form a fluid focusing region 124c in microchannel 104b and at the intersection of fluid focusing microchannels 122c and microchannel 104b. Focusing fluid flowing from microchannel 122c enters from top of microchannel 104b at fluid focusing region 124c and pushes the focused sample fluid stream from fluid focusing region 124b downward such that the sample fluid stream is separated from each side wall by focusing fluid or by inertial effects in microchannel 104b.

In another embodiments of the present invention, as shown in FIG. 5(C), fluid focusing microchannels 122a is positioned above the plane of microchannel 104b and on the same plane as microchannel 104a to form a fluid focusing region 124a at the intersection of fluid focusing microchannels 122a and microchannel 104a. Focusing fluid in microchannel 122a enters microchannel 104a at fluid focusing region 124a and push the focused sample fluid stream away from each sidewall of microchannel 104*a*. If inertial focusing effects are substantial, biasing the flow past the horizontal centerline will be sufficient to direct particles to a single inertial position if measurement region 110 is positioned sufficiently far downstream. Thus, flow into one of the focusing microchannels 122*c* can be set to zero. Fluid focusing microchannel 122*b* is positioned downstream from fluid focusing microchannel 122*a*, below the plane of microchannel 104*a* and on the same plane as microchannel 104*b* to form a fluid focusing region 124*b* at the intersection of fluid focusing microchannels 122*a* and microchannel 104*b*. Sample fluid flowing from fluid focusing region 124*a* and through microchannel 104*a* drops into fluid focusing region 124*b*. Focusing fluid flowing from microchannel 122*b* enters microchannel 104*b* and push the sample fluid stream toward the top of fluid focusing region 124*b* such that the sample fluid is focused to a stream along the top wall of microchannel 104*b*. Fluid focusing microchannel 122*c* is positioned downstream from fluid focusing microchannel 122*b* and above the plane of microchannel 104*b* to form a fluid focusing region 124*c* in microchannel 104*b* and at the intersection of fluid focusing microchannels 122*c* and microchannel 104*b*. Focusing fluid flowing from microchannel 122*c* enters from top of microchannel 104*b* at fluid focusing region 124*c* and push the focused sample fluid stream from fluid focusing region 124*b* downward such that the sample fluid stream is separated from each side wall by focusing fluid or inertial effects in microchannel 104*b*.

Focusing the sample fluid also focuses the particles into a single substantially axially aligned particle stream at a focusing position having an inter-particle spacing. In one embodiment of the present invention, focusing fluid flowing from microchannels 122*a-c* wraps or envelopes the focusing fluid around the sample fluid stream and squeezes the sample fluid stream symmetrically in both vertical and horizontal direction to form a narrow stream, focuses the sample fluid stream to a shape and size consistent with the particles, arranges the particles into a substantially single file particle stream and positions the particle stream at an inertial focusing node within optical interrogation region 112 of microchannel 104*b*. The terms "above" and "below" as used herein to describe the orientation of the microchannels can be reversed if the second layer, which includes microchannels 104*a* and 122*b*, is placed below the plane of microchannels 104*b* and 122*a*, 122*c* and measurement region(s) 110).

Figure 9:
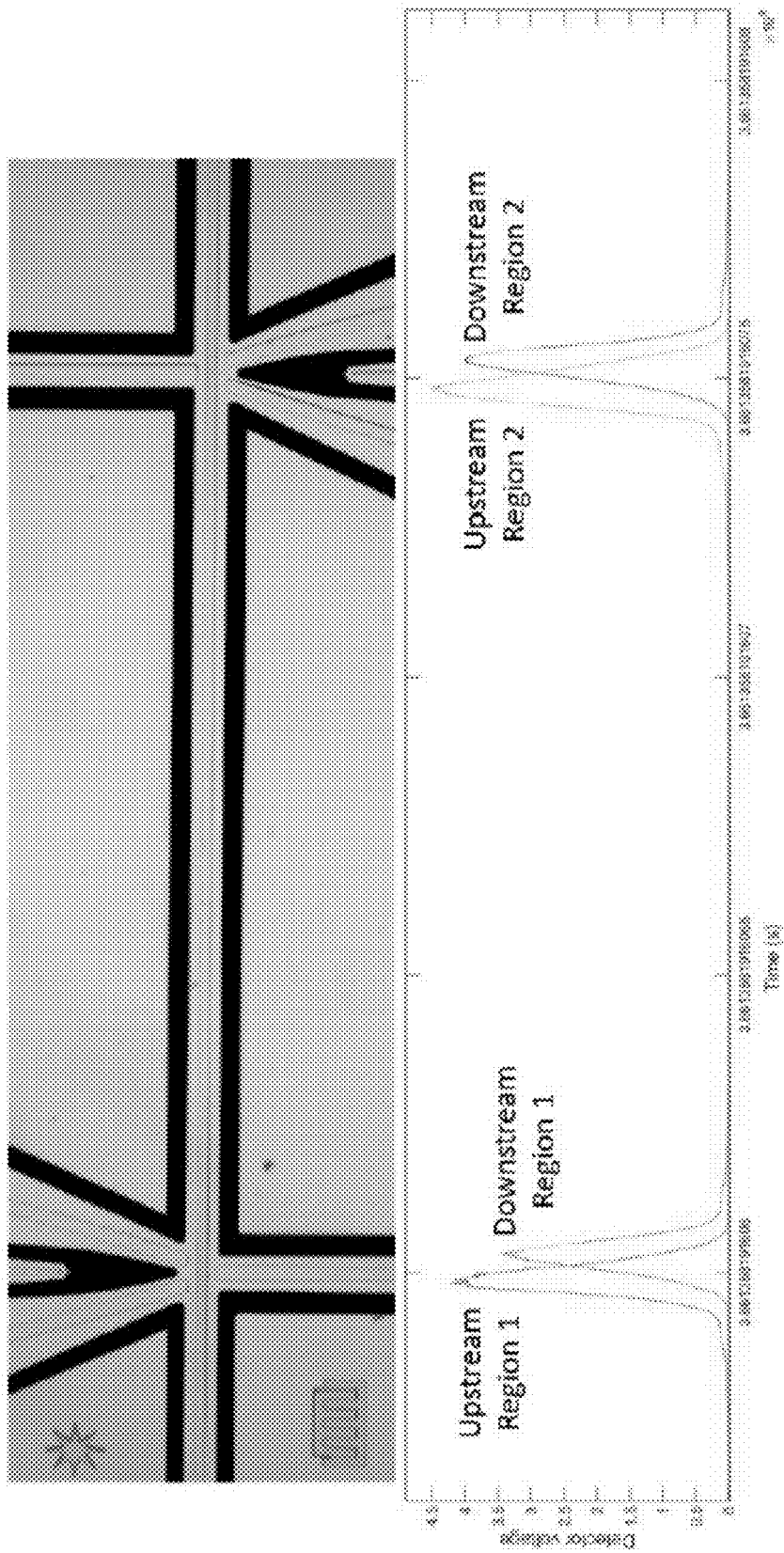
FIG. 9 illustrates a microscopic image of a flow cytometer in accordance with an embodiment of the present invention including two replicate measurement regions and corresponding fluorescence emissions collected.

Substrate 102 includes a plurality of measurement regions 110, as shown in FIG. 2, for measuring particles in the sample fluid flowing through microchannel 104*b*. Measurement regions 110 can be repeated and distributed along microchannel 104*b* with a predetermined spacing between two measurement regions 110, as shown in FIGS. 2 and 9. Spacing between measurement regions 110 may be arbitrary, and the size, shape or location of components of each of measurement regions 110 need not be equivalent. In some embodiments of the present invention, spacing between measurement regions 110 may be determined based on time-dependent changes that particles may undergo along the flow path in microchannel 104*b*. Embodiments of the present invention used for studying time dependent changes in particles (e.g. cells or droplets) or dynamics of the particles themselves (e.g. particle-stream or particle-particle interactions due to inertial forces), may make such configurations more appropriate.

Figure 6:
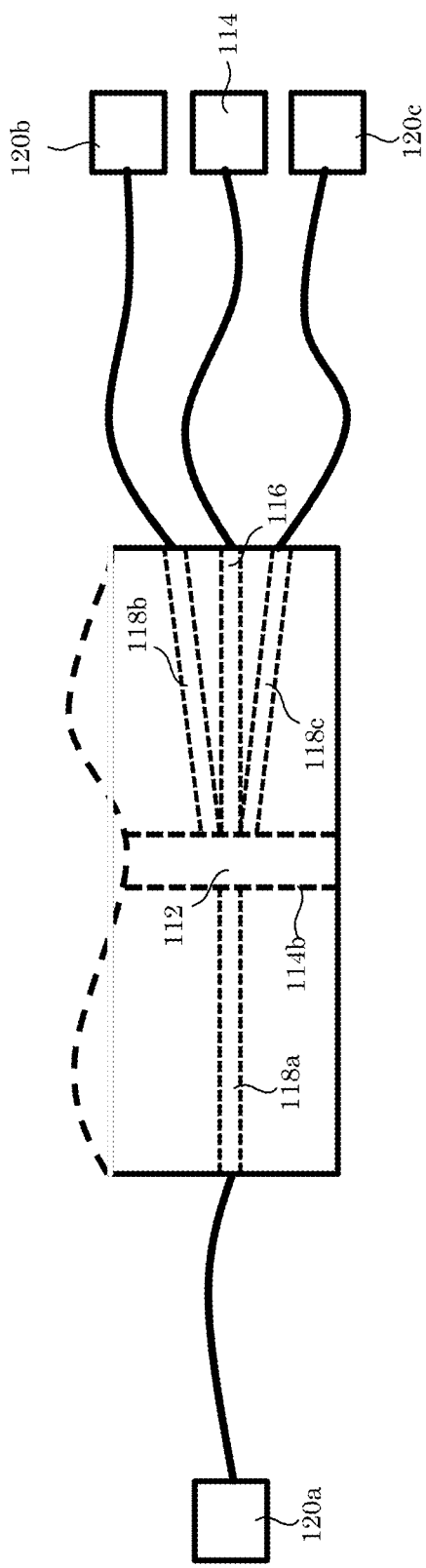
FIG. 6 shows a perspective view of a measurement region in flow cytometer shown in FIG. 1.

FIG. 6 illustrates a perspective view of a single measurement region 110 in accordance with embodiments of the present invention. Each measurement region 110 includes an optical interrogation region 112 that receive excitation light from a light source 114 through an input light path 116 and communicates output light emitted or scattered by particles in optical interrogation region 112 of microchannel 104*b*, as shown in FIGS. 2 and 6. It is contemplated that interaction of excitation light with a particle in optical interrogation region 112 produces output light. Output light can be scattered or emitted from optical interrogation region 112, collected by light collection paths 118*a-c*, and routed to and received by optical detectors 120*a-c*. In one embodiment of the present invention, output light can be fluorescent light from the particles. In another embodiment of the present invention, output light can be scattered light from the particles.

A number of light collection paths can be used and their position relative to microchannel 104*b* and input light path 116 is arbitrary and can be selected to acquire output light from optical interrogation region 112. In embodiments in accordance with the present invention, a plurality of light collection paths can be disposed proximate to and about input light path 116, a light collection path can be disposed opposing input light path 116, or a combination thereof such that light collection paths receive output light and transmits output light to optical detectors 120*a-c*. In a measurement region 110, as shown in FIGS. 2 and 6, input light path 116 can be positioned at an oblique angle or right angle to microchannel 104*b* proximate to optical interrogation region 112. Input light path 116 guides and shapes excitation light from light source 114 to optical interrogation region 112. In one embodiment, input light path 116 shapes excitation light from light source 114 to optical interrogation region 112 by changing the intensity and angles of light emitted into the interrogation region 112. In a measurement region 110, as shown in FIGS. 2 and 6, light collection paths 118*a-c* collect output light from interaction of excitation light with a particle in optical interrogation region 112 and route the output light to detectors 120*a-c*. In one embodiment of the present invention, light collection path 118*a* is positioned at an oblique angle or right angle to microchannel 104*b* proximate to optical interrogation region 112 and opposing input light path 116 such that an axis traversing light collection path 118*a* is parallel to and aligns with an axis traversing input light path 116. Light collection path 118*b* can be positioned before input light path 116 at an oblique angle or right angle to microchannel 104*b* proximate to optical interrogation region 112, and light collection path 118*c* can be positioned after input light path 116 at an oblique angle or right angle to microchannel 104*b* proximate to optical interrogation region 112, as further shown in FIGS. 2 and 6.

Figure 7:
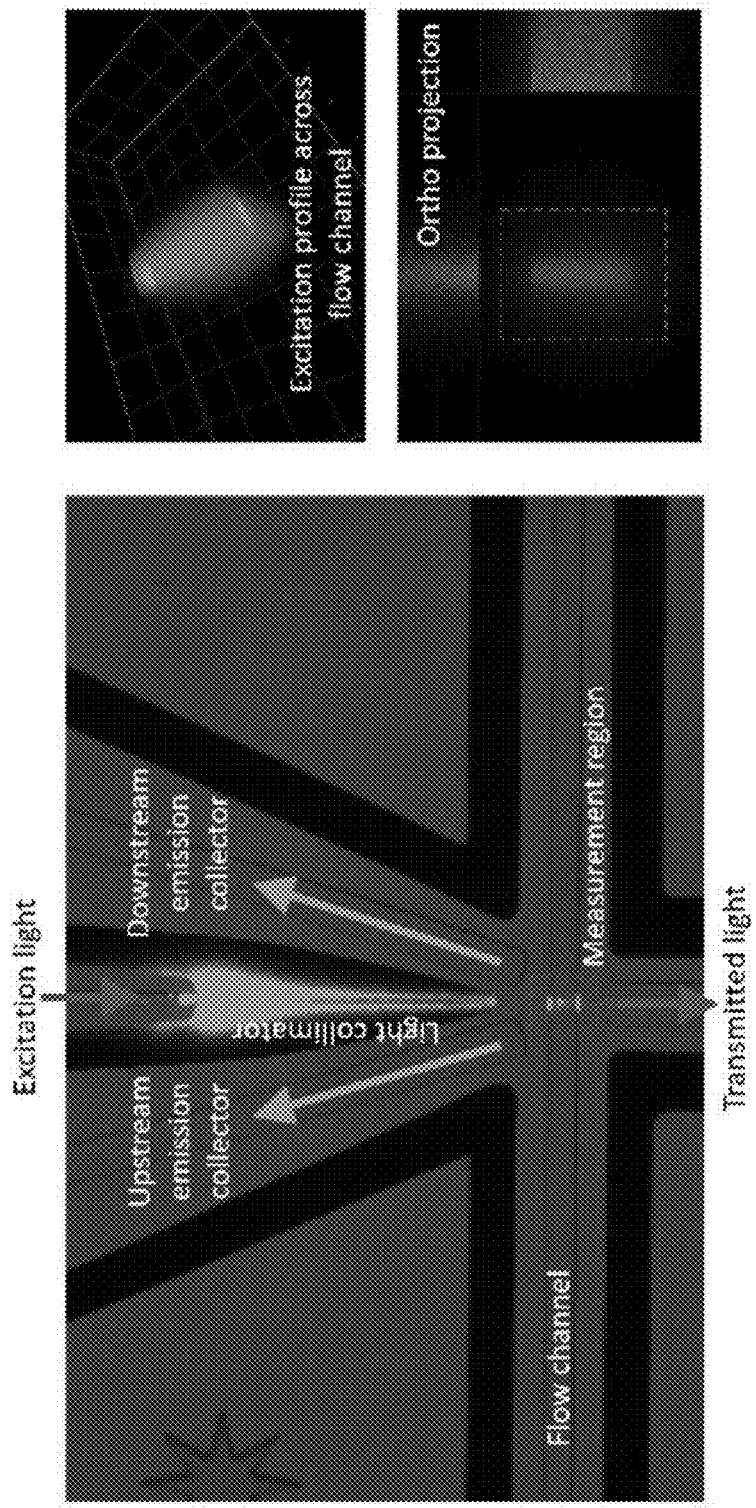
FIG. 7 shows a microscopic image of an exemplary measurement region in accordance with an embodiment of the present invention.

In an embodiment in accordance with the present invention, input light path 116 includes a waveguide for transmitting input light from a light source to optical interrogation region 112. In an embodiment, each of light collection path 118*a-c* independently includes a waveguide for collecting output light from optical interrogation region 112. In some embodiments of the present invention, other optical elements such as collimators may be positioned at or near the end of the waveguide for the excitation light to reduce spatial cross section of the excitation to a predetermined diameter and to generate three-dimensional (3D) projection of an uniform intensity profile of the excitation light. FIG. 7 illustrates a microscopic image of an exemplary measurement region in accordance with an embodiment of the present invention showing the path of excitation light. Symmetric collectors for fluorescence emission or scatter (upstream and downstream) and a collector waveguide for transmitted light are also shown in FIGS. 7 and 9. Three-dimensional and orthogonal projection images of the shape of the excitation profile in the flow channel are also included in FIG. 7. The images in FIG. 7 demonstrate uniform projection of laser power intensity through the measurement region, which improves robustness of the measurement to position of the particle in the interrogation region.

In one embodiment of the present invention, light collection paths 118a-c and waveguides in a measurement region 110 can be located symmetrically about a plane traversing optical interrogation region 112 such that light collection paths 118a-c and waveguides in a measurement region 110 are located either upstream or downstream on opposing side as light collection paths 118a-c and waveguides in an adjacent measurement region 110. In another embodiment of the present invention, light collection paths 118a-c and waveguides in a measurement region 110 can be located in a non-symmetrical manner such that light collection paths 118a-c and waveguides in a measurement region 110 are located either upstream or downstream on same side as light collection paths 118a-c and waveguides in an adjacent measurement region 110. It has now been discovered that symmetrically oriented light collection paths located in measurement regions exhibit symmetries in corresponding measurement signals such that the signals can be transformed onto one another. Such transformations of symmetrical measurement signals enable pointwise comparison of multiple signals, as shown by an example in FIG. 8. Transformations of symmetrical measurement signals also allow the symmetric light collectors to generate statistics for measurement repeatability. Measurement signals collected from nonuniform particles located in measurement regions lose their symmetry and thereby exhibit quantifiable differences. This facilitates characterization of nonuniformity or distortion of the particle shape and/or fluorescence signal through measurement regions. In some embodiments of the present invention, microchannel 104b can be modified to induce shape changes and thereby allow dynamic study of shape recovery.

A number of optical detectors may be utilized and their position relative to microchannel 104b and light collection paths 118a-c is arbitrary and can be selected to acquire output light from light collection paths 118a-c. In an embodiment in accordance with the present invention, optical detector 120a is positioned to detect output light propagated by light collection path 118a, optical detector 120b is positioned to detect output light propagated by light collection paths 118b, and optical detector 120c is positioned to detect output light propagated by light collection paths 118c. It should be appreciated that with regard to FIGS. 1 and 6, although drawn as separate detectors for convenience of illustration, such optical detectors can be a single optical detector.

In an alternate embodiment of the present invention, flow cytometer 100 includes beam combiner in optical communication with light collection paths 118a-c to receive output light from light collection paths 118a-c in a measurement region 110 and optically combine output light received from light collection paths 118a-c into a single optical light beam that is communicated to a single optical detector. In an embodiment of the present invention, flow cytometer 100 includes an analyzing module configured to extract a three-dimensional morphology parameter of each of the plurality of particles from a spatially coherent distribution of the output light detected by the optical detectors 120a-c.

Figure 10:
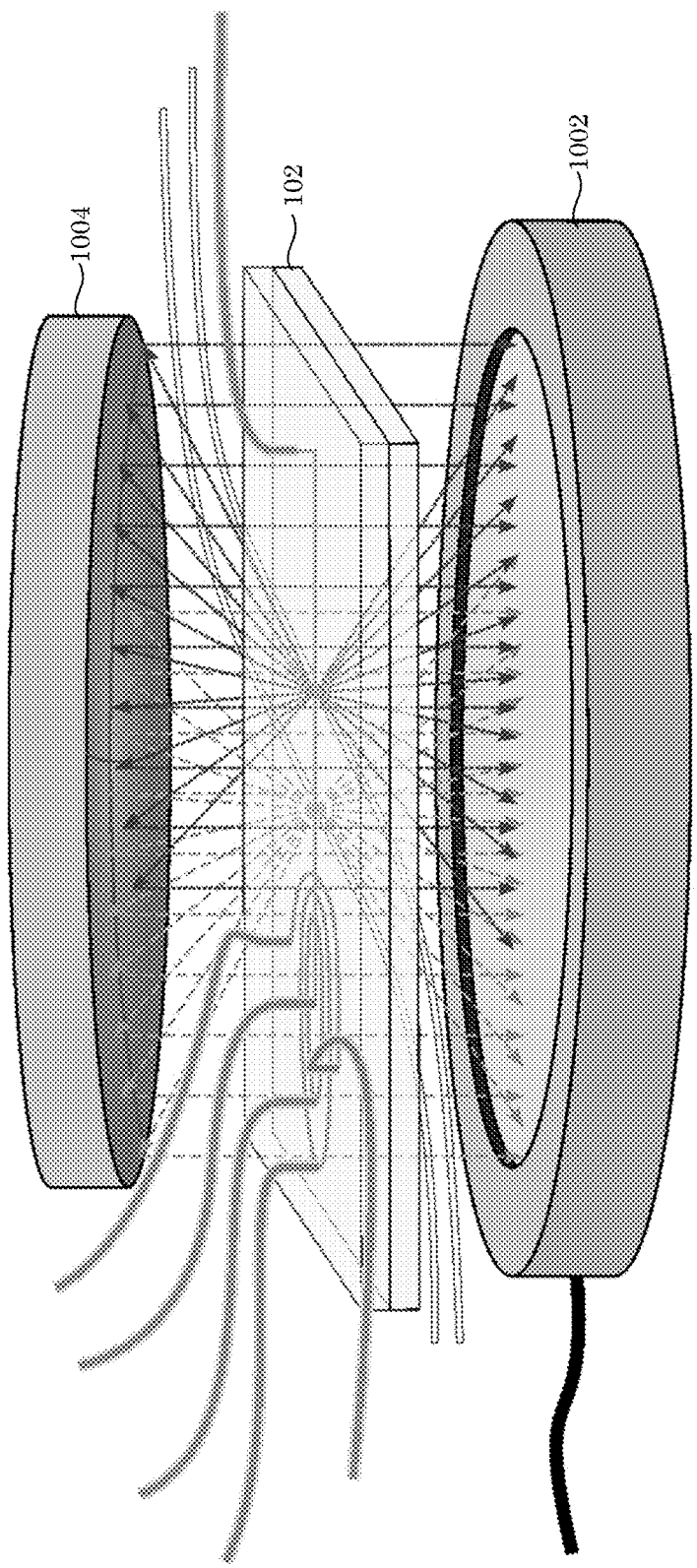
FIG. 10 illustrates an exemplary flow cytometer in accordance with an embodiment of the present invention including a photomultiplier tube positioned below the flow cytometer.

In an embodiment of the present invention, the analyzing module includes an optical microscope. In an alternative embodiment of the present invention, the analyzing module includes an optical detector that is positioned in close proximity with the flow cytometer 100. In an embodiment, optical detector 120a is disposed on a first side of substrate 102, and optical detectors 120b-c are disposed on an opposing side of substrate 102 so that substrate 102 is interposed between optical detector 120a and optical detectors 120b-c. FIG. 10 illustrates an exemplary embodiment in accordance with the present invention wherein the excitation lasers are amplitude modulated at different frequencies and detected directly on a photomultiplier tube 1002 positioned below flow cytometer 100 to collect output light from interrogation regions 112. A large photomultiplier, for example, could acquire roughly 50% of light emitted hemispherically. In another embodiment of the present invention, a mirror 1004 is positioned above substrate 102 to reflect output light emitted from interrogation region 112 in a direction above substrate 102 back to photodetector 1002 such that substantially all emitted and scattered light is collected on photodetector 1002. In an alternative embodiment of the present invention, mirror 1004 is replaced with a second photomultiplier tube to collect light from a different perspective compared to the first photomultiplier tube.

Figure 8:
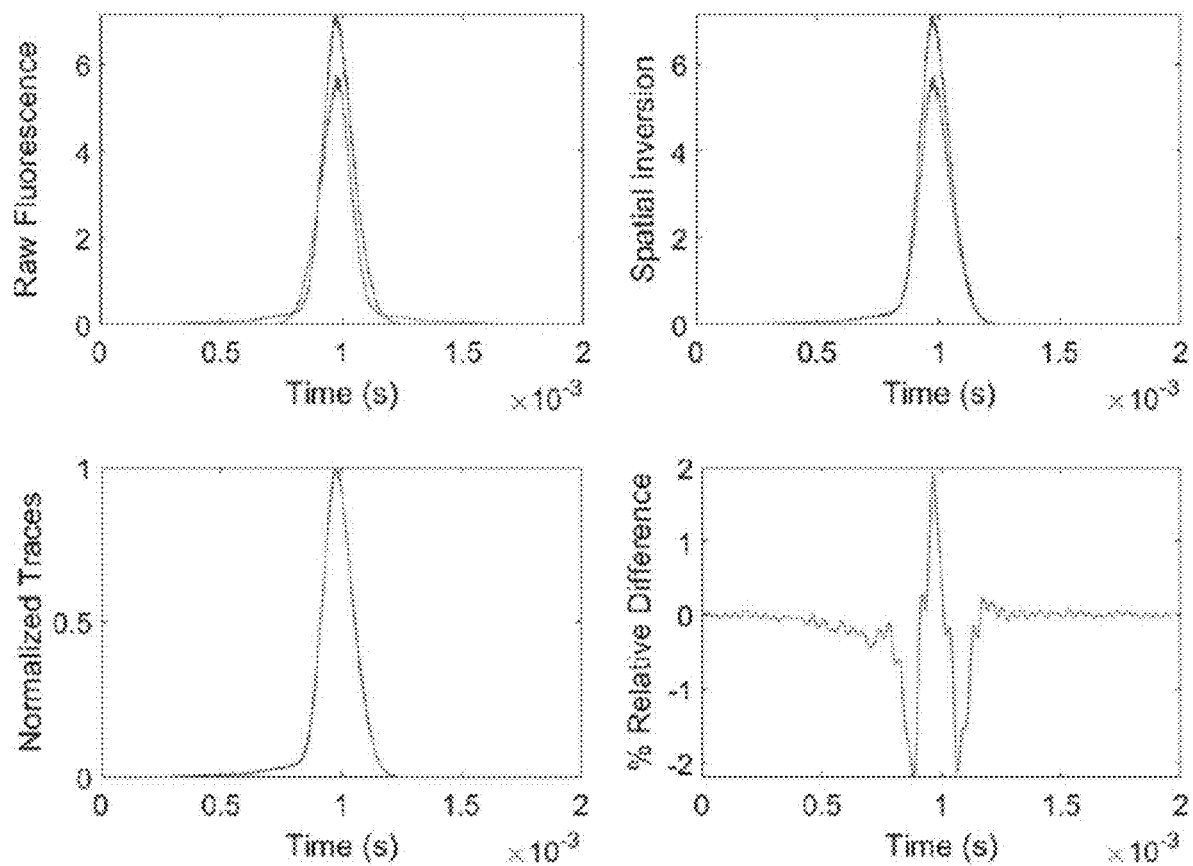
FIG. 8 illustrates an example pointwise comparison of upstream and downstream measurement signals using a flow cytometer in accordance with an embodiment of the present invention.

Data from two photomultiplier tubes could be used as independent replicate measurements of particles or for comparison of particle deformation or inhomogeneity of emitted light, in a manner similar to the data of FIG. 8. In another embodiment, an imaging device such as a microscope is used instead of mirror 1004 in order to simultaneously observe particles (and to collect the emitted light) moving through microchannels 104a-b in flow cytometer 100. The microscope can be used to validate the range of fluorescence intensities, positions, and speeds of the particles through the measurement regions.

In an embodiment of the present invention, light from light source 114 is encoded with amplitude modulation at a particular frequency to enable simultaneous detection of light from all measurement regions 110. In an exemplary embodiment, light from light source 114 is encoded with amplitude modulation at a particular frequency that could encode the wavelength of the light and/or the measurement region from which the light is incident such that light from all measurement regions, including multiple wavelengths, can be simultaneously detected on the photodetector(s) in close proximity to the flow cytometer 100 and decoded based on their unique modulation frequencies. Such embodiments of the present invention enable robust detection of substantially all output light from multiple measurement regions simultaneously, reducing the complexity of the flow cytometer fabrication and the number of optical detectors. In one embodiment of the present invention, the light collection path 118a is used with photodetector(s) in close proximity to flow cytometer 100 in order to collect an amount of input light from light source 114 such that the collected light can be scaled to the power incident on optical interrogation region 112 and/or used as a source for detecting phase shifts of output light, in a manner typically performed for detecting fluorescence lifetimes.

Figure 11:
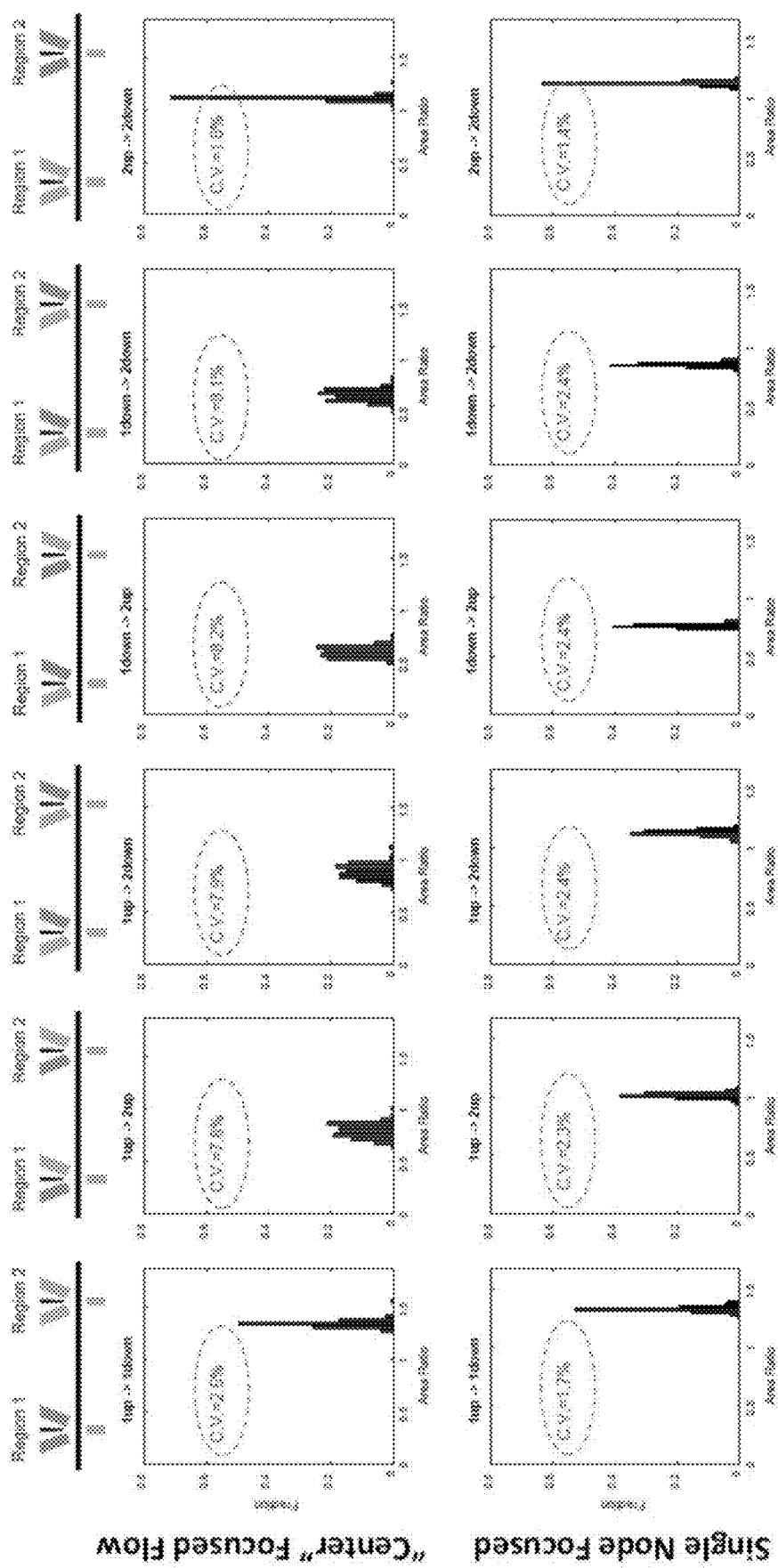
FIG. 11 illustrates distribution of particle intensity variations in measurements without (nonexemplary) and with (exemplary) single-node inertial focusing using flow cytometer in accordance with an embodiment of the present invention.

Flow cytometer 100 in accordance with embodiments of the present invention can be used to perform repeat measurements of a particle in a sample fluid at a plurality of measurement regions 110 without fluidic focusing to a location within optical interrogation region 112. It has been discovered that measurements of a particle in a sample fluid at a plurality of measurement regions 110 can be accomplished when there is no hydrodynamic focusing, inertial forces can be ignored or are negligible, or particle-based Reynold's numbers are smaller than 1. It has also been discovered that minimizing migration of a particle to a different part of optical interrogation region 112 is advantageous for reproducibility of measurements, as each particle then samples the same portion of the laser intensity in optical interrogation region 112 and is most likely to travel at the same velocity, thus spending the same amount of time in optical interrogation region 112. Without hydrodynamic focusing or when inertial forces are significant, particles can migrate to different positions in the cross section of microchannel 104b, which causes increased distribution of intensities and reduced apparent reproducibility of a single bead measurement from one measurement region to another. FIG. 11 illustrates distribution of ratios of particle intensities compared across measurement regions without and with hydrodynamic focusing to a single inertial focusing node. As shown in FIG. 11, larger coefficient of variation for particle intensity ratios are observed when focusing to a single inertial node is not used and a decrease in the coefficient of variation is observed when inertial forces move the particle closer to the inertial node.

Figure 12:
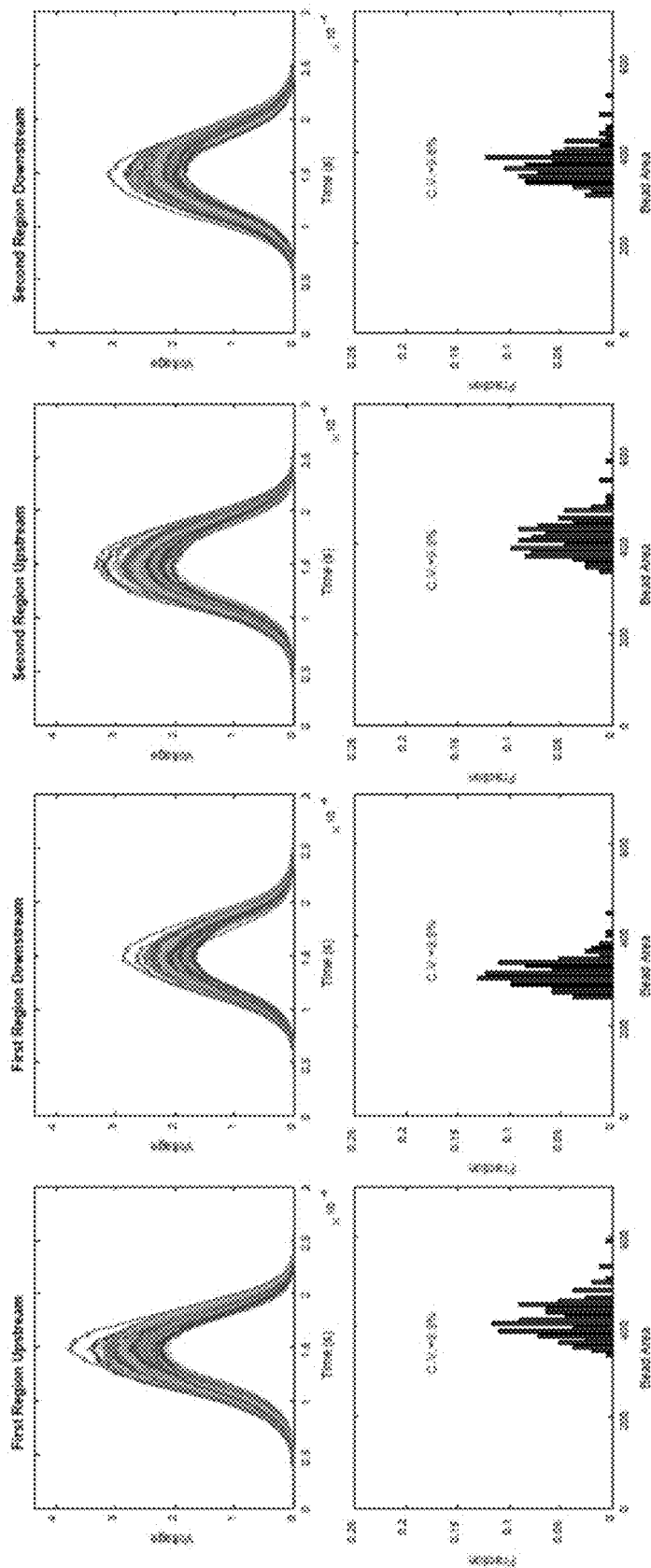
FIG. 12 illustrates exemplary fluorescence emission and histograms of integrated intensities with coefficient of variation from 100 beads collected from the four measurement regions of a flow cytometry in accordance with an embodiment of the present invention.

Hydrodynamic focusing using fluid focusing microchannels 122a-c to position a particle to the inertial focusing node improves region-to-region repeatability, as shown in FIGS. 11 and 12. FIG. 12 shows when a particle is pre-focused to an inertial node, coefficients of variation (C.V.) of particle intensities at any of measurement regions 110 is better (<10%) than C.V. obtained for a particle measured only one time using a commercial flow cytometer (10.5%). Further, normalization can be achieved by ratiometric comparison of the signal height, area, or pointwise in time. In other embodiments of the present invention, methods for focusing sample fluid stream and particles can include applying an asymmetric force to the particles to produce localized fluxes of particles. The asymmetric force can include, but is not limited to, centrifugal, hydrodynamic drag, electrical, magnetic, thermal, sonic, optical, or dielectrophoretic forces.

Flow cytometer 100 includes a fluidic system 126 in communication with microchannels 104a-b to transport fluid stream containing sample particles to optical interrogation region 112 and to hydrodynamically focus fluid stream containing sample particles to a relatively smaller observation stream in which the particles pass in a substantially single file manner through optical interrogation region 112 of microchannel 104b. Fluidic system 126 includes a sample pump to pump fluid stream containing sample particles into microchannel 104a, a sheath pump to pump focusing fluid from a sheath container into fluid focusing microchannels 122a-c and a fluid controller to adjust the flow rate of the sample fluid into microchannel 104a and the flow rate of focusing fluid into fluid focusing microchannels 122a-c. Each pump can independently control flow rate or an additional flow controller can be included to coordinate the flows of multiple controllers simultaneously, as would be desired when switching from one flow condition to another so as to induce minimal disturbance to or smoothest transition between focusing conditions. The flow rate ratios of each pump rate to the total flow approximately determines the cross-sectional area filled by each fluid component in the cross section of microchannel 104b (and thus tuning of the size and 3-dimensional positioning of the fluid stream containing sample particles within microchannel 104b). The magnitude of the total flow, however, is used to determine such factors as the particle-based Reynolds number, which determines whether inertial forces will lead to particle migration to stable nodes within the channel cross section.

In one embodiment of the present invention, the flow focusing ratios are tuned based on the size of the sample particles to account for different inertial focusing positions. In another embodiment of the present invention, the focusing position is biased to the node closer to the light excitation path 116. In yet another embodiment of the present invention, the focusing position is biased to the node further from the light excitation path 116. In one embodiment of the present invention, the magnitude of the total flow is selected such that the particle based Reynolds number is between 1 and 10. More specifically, the particle-based Reynolds number is between 1.5 and 3.5. In some embodiment of the present invention, flow rates are changed over the course of the experiment to study the change in position, velocity, or intensity of particles to understand their response to inertial forces. In one embodiment, flow rates are tuned to meet specific measurement criterion or to minimize variation in particle velocity, intensity (either peak or time-integrated), or position.

In an embodiment in accordance with the present invention, microchannels 104a-b are optionally connected to fluidic system 126 that serves to flow sample fluid and particle through microchannels 104a-b. In an embodiment, fluidic system 126 includes a syringe pump that delivers volumetric flow from 100 picoliter per minute (pL/min) to 100 microliters/min. In an embodiment, fluidic system 126 includes a vessel filled with fluid at a fixed height above fluid outlet 108 of microchannels 104b. Gravity can control pressure on sample fluid and drive the flow rate as a function of fluidic resistance through microchannels 104a-b. In an embodiment, external pressure is applied to the fluid-filled vessel in order to provide a selected pressure drop. Exemplary pumps in fluidic system 126 include peristaltic and rotary pumps, piston pumps, diaphragm pumps, and the like.

Figure 13:
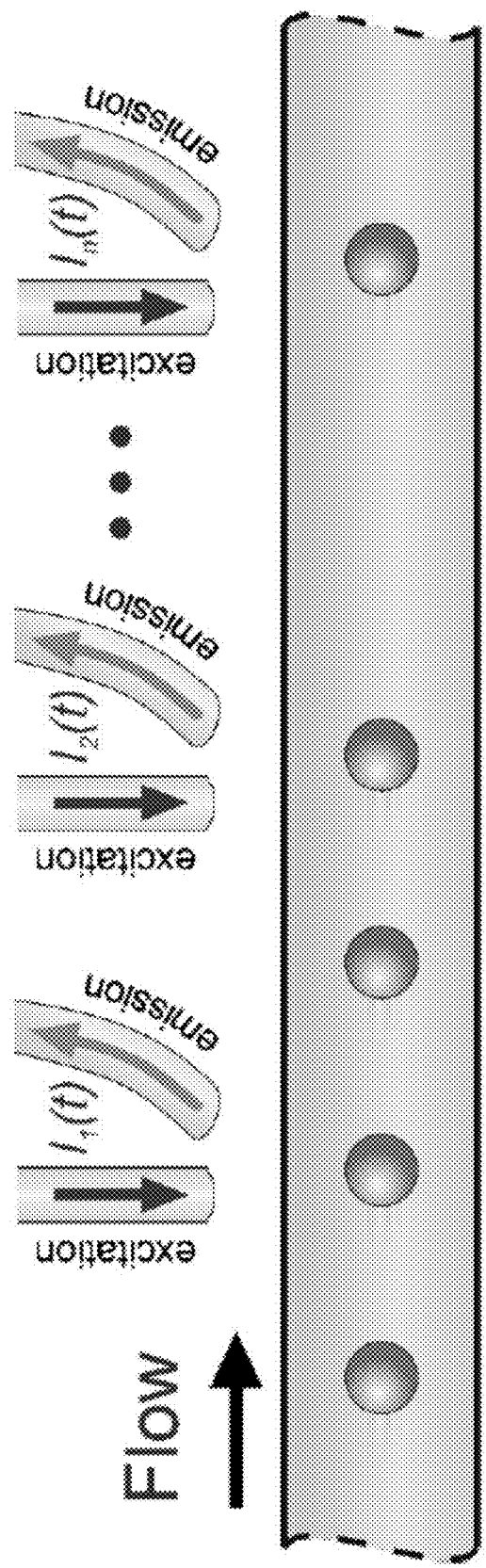
FIG. 13 illustrates an exemplary schematic of repeat measurements of a fluorescent particle flowing through multiple measurement regions of a flow cytometer in accordance with an embodiment of the present invention.

During typical operation of flow cytometer 100, a sample fluid including particles enters microchannels 104a at fluid inlet 106, transported through microchannels 104a-b and exits microchannel 104b through fluid outlet 108. Fluid focusing microchannels 122a-c hydrodynamically focus sample fluid and particles to a relatively smaller observation stream in which the particles form a substantially single file manner such that only a single particle enters optical interrogation region 112 of each measurement region 110 at a time. As a particle enters optical interrogation region 112, excitation light from light source 114 is communicated by input light path 116 to optical interrogation region 112, wherein the excitation light interacts with the particle in optical interrogation region 112 and produces output light from the particle in response to interaction of the particle with the excitation light in optical interrogation region 112. Output light from the particle is guided by light collection paths 118a-c to optical detectors 120a-c. The particle exiting a measurement region 110 is transported in the focused sample fluid by fluidic system 126 to next measurement region 110 where the particle is measured again using above technique. The measurement of the particle is repeated at every measurement region 110 in microchannel 104b. FIG. 13 illustrates an exemplary schematic of repeat measurements of a fluorescent particle flowing through multiple measurement regions 110 of a flow cytometer 100 in accordance with an embodiment of the present invention.

Advantageously, in an embodiment of flow cytometer 100, acquiring multiple measurements of particles in measurement regions 110 enables detection and separation of particles that enter the measurement region simultaneously or are stuck together. The process if facilitated by time-dependent sampling of particles as shown in FIGS. 8, 9, and 12.

Substrate 102 can include a material that provides flow in microchannels 104a-b. Moreover, substrate 102 can be disposed in or can include a microfluidic device. Exemplary materials for substrate 102 include a polymer such as an elastomer (e.g., PDMS), epoxy, adhesive (e.g., an adhesive tape, photocurable adhesive, and the like), acrylic (e.g., PMMA), polycarbonate, polystyrene, polyester, polypropylene, cyclic olefin copolymer, hard material (e.g., a glass, semiconductor (e.g., pure and doped silicon), or metal (e.g., aluminum)). Substrate 102 can include a combination of transparent, opaque, or reflective boundaries to control light propagation in or through an interior of flow cytometer 100. In an embodiment, substrate 102 includes a structure to absorb, scatter, or reflect light out of the optical paths or to prevent cross-talk between light paths. In an embodiment of the present invention, substrate 102 includes specific refractive indices to control optical interactions of absorbed, transmitted, emitted, and scattered light.

Microchannels 104a-b can be formed in a curable polymer such as PDMS cast from a photoresist pattern provided in a photolithographic process. In an embodiment, microchannels 104a-b are formed by laser oblation or chemical etching of a material such as glass. Forming microchannels 104a-b can occur by milling, cutting, embossing, and the like. Printing, e.g., 3D printing of substrate 102 can form microchannels 104a-b or other structural element of flow cytometer 100.

Dimensions of microchannels 104a-b are selected based, e.g., on a type of flow through flow cytometer 100, or properties of fluids, particles, or detectors 120. Dimensions such as width (W) or height (H) of microchannels 104a-b can be from 10 nm to 1 mm, specifically from 1 micrometer to 500 micrometers for water. Dimensions can depend on speed of fluid through flow cytometer 100 or pressure on sample fluid. A shape of microchannels 104a-b can be, e.g., rectangular, circular, or a combination thereof, can have a uniform or non-uniform cross section, or can be confined to a linear configuration or fixed within a single plane along its length. For example, microchannels 104a-b can include a wall that bounds microchannels 104a-b and that can curve, bend, or split or can include a junction to direct sample fluid in flow cytometer 100. A length (L) of microchannels 104a-b can be selected based on the size of optical interrogation region 112 and that provides selected convective or diffusion of sample fluid between optical interrogation regions 112. The length of microchannels 104a-b can be from 1 micrometer to 1 meter, and specifically from 100 micrometers to 20 centimeters. In an embodiment, microchannels 104a-b has a rectangular cross section and has width and height that are independently 125 micrometers. In another embodiment, microchannels 104a-b has a rectangular cross section and has width and height that are 40 micrometers and 80 micrometers, respectively. In an embodiment, microchannels 104a-b is a glass capillary that has an internal diameter of 125 micrometers.

In flow cytometer 100, fluid inlet 106 and fluid outlet 108 connect flow cytometer 100 to an external source of fluid (such as sample fluid from fluid system 126) or sinks, respectively, or to fluid outlet 108 or fluid inlet 106 from another flow cytometer 100, respectively. Fluid inlet 106 and fluid outlet 108 can provide smooth transition to microchannels 104a-b and can have similar cross-sectional dimensions. Moreover, fluid inlet 106 or fluid outlet 108 can include a seal or a mechanical device so that sample fluid is unidirectionally flowed from fluid inlet 106 to fluid outlet 108 in microchannels 104a-b. Additionally, fluid outlet 108 can include valves or bifurcations to control fluid flow in microchannels 104a-b. Embodiments in accordance with the present invention further includes fluid inlet ports to connect fluid focusing microchannels 122a-c to an external source of focusing fluid.

Sample fluid flows through microchannels 104a-b. It is contemplated that sample fluid can include includes gas, miscible or immiscible liquid components, solid particles, compounds, or small molecules disposed in sample fluid. Exemplary sample fluid includes water, bodily fluid, organic solvent such as alcohols and fuels, and the like. Solid particles, compounds, and small molecules can include chemical compounds that absorb, scatter, or emit light such as fluorescent dyes, inorganic or organic microparticles or nanoparticles, beads, biological materials such as proteins and protein aggregates, lipid vesicles, exosomes, organelles, cells and parts of cells or cellular components. Cells can include, but are not limited to, bacterial cells, blood cells, cancer cells, tumor cells, mammalian cells, protists, plant cells, and fungal cells. Moreover, sample fluid can include a combination of different constituents.

In some embodiments of the present invention, focusing fluid has a focusing fluid viscosity that is different from the viscosity of the sample fluid. Fluid focusing fluid can include viscosity agents or modifiers to provide a viscosity that differs from the viscosity of the sample fluid. Exemplary viscosity agents or modifiers can include, for example, natural hydrocolloids (and derivatives), such as Acacia, tragacanth, alginic acid, carrageenan, locust bean gum, guar gum, xanthan gum, gum arabic, guar gum, gelatin, cellulose, alginates, starches, sugars, dextrans; gelatin; sugars (and derivatives), such as dextrose, fructose; polydextrose; dextrans; polydextrans; saccharides; and polysaccharides; semi-synthetic hydrocolloids (and derivatives), such as glycerol, methylcellulose, hydroxyethyl starch (hetastarch), sodium carboxymethylcellulose, hydroxyethylcellulose, hydroxypropylmethylcellulose, polyvinylpyrrolidone (PVP); synthetic hydrocolloids (and derivatives), such as Polyvinyl alcohol (PVA). Other cell compatible viscosity agents are also considered useful for this purpose.

Depending on substrate 102, sample fluid, or dimensions of microchannels 104a-b, a pressure of sample fluid in microchannels 104a-b can be from 0 Pascals (Pa) to 700 kPa, specifically from 0 Pa to 130 kPa, and more specifically from 0 Pa to 70 kPa. A viscosity of sample fluid can be from $1 \times 10^{-6}$ to 1 Pa·s, specifically from $10 \times 10^{-6}$ to 0.1 Pa·s, and more specifically from $1 \times 10^{-4}$ to 0.01 Pa·s. Flow can be unidirectional, and pressure can be positive or negative. Flow can be controlled with constant or variable pressures or with constant or variable volumetric displacements, such as those that might be provided by a syringe pump.

In flow cytometer 100, a particle independently can include reflective, absorptive, fluorescent, reactive, or optically active components that permit contrast in the presence of light. A particle can include single molecules, compounds, nanoparticles, microparticles, vesicles, liposomes, emulsions, droplets, cells and parts of cells, and the like. A particle independently can include, e.g., fluorescein and derivatives thereof. Specifically, a derivative could be fluorescein-conjugated antibodies, calcium-reactive dyes, pH sensing dyes, enzyme-activatable fluorophores or caged compounds, and the like. A particle independently can be selected based on the wavelength of excitation light. A particle can be selected, independently, based on its diffusion coefficient, absorbance, or emission spectra. A particle excitation, bleaching, or emission wavelengths independently can be from 240 nm and 1000 nm, specifically from 350 nm to 800 nm.

In flow cytometer 100, input light path 116 can be disposed in substrate 102 as a microchannel, e.g., a void in substrate 102. Input light path 116 can be in optical communication with light source 114 by an optical fiber or along light paths as excitation light propagates. Input light path 116 can include a bifurcation or optical element that changes a direction, intensity, or spectrum of excitation light along input light path 116.

In flow cytometer 100, light source 114 can include light-emitting diodes or lasers to emit light at a desired wavelength. The properties of light source 114 and its type can be selected based on the packaging of flow cytometer 100, level of interaction with particle, or transmission of light by input light path 116.

In flow cytometer 100, excitation light can induce fluorescence, scatter, or absorption in particle in optical interrogation region 112. Excitation light can be selected based on interaction with particle and can have wavelength from 240 nm to 1000 nm, more specifically from 350 nm to 800 nm. In an embodiment, wavelength of excitation light is from 450 nm to 500 nm. In an embodiment, wavelength was 488 nm. An intensity of excitation light is selected based on size, structure, and composition of the particle, nature of the flow of sample fluid, and desired characteristics of output light. The intensity of excitation light can be from 1 nanowatt (nW) to 1 W. In an embodiment, the intensity of excitation light can be from 1 microwatt to 200 mW. Excitation light independently can be continuous or modulated from 1 Hz to 300 GHz, specifically from 1 kHz to 100 MHz, and more specifically from 100 kHz to 100 MHz.

In flow cytometer 100, input light path 116 transmits excitation light from light source 114 to optical interrogation region 112. Moreover, input light path 116 can include a filter or bifurcation to reduce the intensity of excitation light or direct part of excitation light to a light intensity meter. In an embodiment, input light path 116 includes a waveguide filled with optical material that permits total internal reflection of light. In an embodiment, the optical material is a photocurable adhesive that has a higher index of refraction than substrate 102. In an embodiment, the optical adhesive has a refractive index between 1.42 and 1.7. More specifically, the optical adhesive has a refractive index of 1.50 to 1.56. In an embodiment, input light path 116 has a curved end to shape the light in optical interrogation region 112. In an embodiment, excitation light is approximately uniform intensity across the optical interrogation region 112.

In flow cytometer 100, optical interrogation region 112 is where excitation light interacts with particles to induce fluorescence, bleaching, scatter, or absorption by a particle and from which output light initially propagates out of microchannel 104b. In an embodiment, excitation light induces a particle to emit fluorescence. In an embodiment, excitation light causes some of a particle to emit fluorescent light as output light and some of particle to bleach (e.g., be destroyed and stop emitting fluorescence). The intensity of excitation light with the amount of time a particle spends in optical interrogation region 112 (e.g., the speed of a particle) can determine an amount of bleaching versus emitted fluorescence or other type of production of output light.

In flow cytometer 100, light collection paths 118a-c communicate output light from optical interrogation region 112. Light collection paths 118a-c can include filters or bifurcations to reduce the intensity of light or direct part of output light to a light intensity meter or spectrometer. In an embodiment, each light collection paths 118a-c is a waveguide filled with optical material that permits total internal refection of light. In an embodiment, the optical material is a photocurable adhesive that has a higher index of refraction than substrate 102. In an embodiment, the optical adhesive has a refractive index between 1.42 and 1.7. More specifically, the optical adhesive has a refractive index of 1.50 to 1.56. In an embodiment, light collection paths 118a-c include lens elements to focus light into light collection paths 118a-c and is slightly wider than input light path 116 in order to capture more output light from optical interrogation region 112.

In flow cytometer 100, output light can be fluorescence, scattered light, or a change in transmission of excitation light to become output light resulting from interaction of excitation light with particle in optical interrogation region 112. In an embodiment, output light is emitted light from a fluorescent tag in particle. In an embodiment, output light is loss of fluorescence due to photobleaching of particle. Output light can be modified by components of light collection paths 118a-c and can have a wavelength from 240 nm to 1000 nm, and specifically from 350 nm to 800 nm.

In flow cytometer 100, optical detector 120 records properties of output light. In an embodiment, each of optical detectors 120a-c is connected to its light collection paths 118a-c by an optical fiber. In an embodiment, the optical fiber is a 125-micrometer diameter multimode fiber that carries a visible wavelength of light. In an embodiment, each of optical detectors 120a-c is a broadband photodiode connected to a power meter. In an embodiment, each of optical detectors 120a-c is a broadband photomultiplier tube or avalanche photodiode or the like. In an embodiment, each of optical detectors 120a-c is a photodetector with pixels. In an embodiment, each of optical detectors 120a-c has a spectral range from 200 nm to 1100 nm. In an embodiment, each of optical detectors 120a-c is preceded by an optical filter that excludes excitation light to enhance collection of emitted fluorescence light as output light over excitation light. In an embodiment, the filter blocks wavelengths outside the range from 510 nm to 530 nm, allowing only fluorescence emitted from fluorescein to reach the detector. In an embodiment, the filter includes multiple spectral bandpass regions to enable multiple fluorescent signals to be passed while excluding their respective excitation wavelengths. In an embodiment, each of optical detectors 120a-c includes an amplifier to further amplify the electronic signal of the excitation light. In some embodiments of the present invention, each of optical detectors 120a-c is preceded by a collimating optical element arranged to receive the output light from the interrogation region, wherein the collimating optical element is configured to project a collimated beam including the output light to light collection paths 118a-c.

It is contemplated that excitation light from light source 114 can have a same wavelength as output light such that each of light collection paths 118a-c is offset from input light path 116 to avoid direct detection of excitation light by output light. In an embodiment, each of optical detectors 120a-c is a spectrometer that measures a spectrum of output light. Each of optical detectors 120a-c can be a photodiode, photomultiplier tube, or the like integrated in flow cytometer 100 or interfaced with substrate 102. It is contemplated that each of optical detectors 120a-c is in direct optical communication with at least one of light collection paths 118a-c without intervening components therebetween.

The optical filter can be an optical bandpass filter that transmits a selected wavelength or range of wavelengths (e.g., fluorescence emission) while blocking other wavelengths (e.g., fluorescence excitation or other background sources of light). The optical filter can include a selected number of bandpass regions (e.g., 1, 2, 3, or more) to enable simultaneous transmission or rejection of excitation wavelengths of fluorescent species.

In an embodiment of the present invention, a beam combiner is optically interposed between each of light collection paths 118a-c and each of optical detectors 120a-c to receive output light transmitted through each of light collection paths 118a-c, combine output light transmitted through light collection paths 118a-c into a single beam of output light, and communicate the single beam of output light to a single optical detector. Exemplary beam combiners include fiber optic couplers, prisms and mirrors, dichroic combiners, and the like.

In an embodiment, a demodulator receives multiplexed amplitude modulation signal from optical detectors 120a-c. Demodulator deconvolves multiplexed amplitude modulation signal into individual demodulated signals that respectively correspond to each output light transmitted through each of light collection paths 118a-c. Demodulator receives modulation frequencies for each output light transmitted through each of light collection paths 118a-c for deconvolution. Demodulator can be, e.g. a phase sensitive detector such a lock-in detector.

Each demodulated signal that respectively correspond to each output light transmitted through each of light collection paths 118a-c is subjected to a frequency filter to produce an amount of light from optical interrogation region 112 of each measurement region 110 or corresponding to each excitation wavelength of each measurement region 110. Frequency filters independently can be a digital or analog filter that can be implemented in hardware or software. Exemplary frequency filter includes a transcendental function such as an exponential function, logarithm, trigonometric function, and the like and can include a particular frequency and time element such as sin (w*t), wherein w is a frequency, and t is time.

In an embodiment, demodulator includes an analog to digital converter such as a digitizer that can provide data to a computer and can include a functionality that can be provided by software to produce values for amounts of light from demodulated signals that correspond to each output light transmitted through each of light collection paths 118a-c or corresponding to each excitation wavelength. In an embodiment, the analog-to-digital converter has 16 bits resolution and 2GS/s sampling rate.

In an embodiment, modulation frequency is produced by a signal generator that produces output voltage sine waves from 0 to 1 V over frequencies from 1 Hz to 100 MHz. In an embodiment, the signal generator is in communication with the demodulator. In an embodiment, the signal generator communicates modulation frequency to a laser that can control output power from 0 to 200 mW continuously or with up to 150 MHz analog modulation. In an embodiment, each excitation wavelength from each laser is encoded with a different modulation frequency.

Flow cytometer 100 can be made in various ways. In an embodiment, a process for making flow cytometer 100 includes defining a microchannel and waveguides in a substrate. The process for defining these features can involve subtractive manufacturing (e.g., laser ablation, engraving, cutting, etching, etc.) or additive manufacturing (e.g., 3D printing, controlled deposition, templated substrate growth, and the like) or photolithography to define topographic features that become or will be used to produce constituent elements of flow cytometer 100, such as microchannels 104a-b and waveguides for excitation light and output light. In an embodiment, topographic features were produced on silicon wafers using photolithography. A negative photoresist polymer (e.g., SU8) was used as the photosensitive polymer to produce the topographic patterns on a silicon wafer. In an embodiment, the SU8 features were approximately the same height as an optical fiber diameter. Alternative methods to produce topographic features that can include milling and embossing of metals or plastics or etching materials such as glass and silicon. Topographic features are typically treated with a non-stick material such as a silane to facilitate removal of substrates after casting.

In an embodiment, features in substrate 102 are produced by casting and curing a liquid material such as poly (dimethylsiloxane) (PDMS) against the topographic features. Other exemplary casting materials include epoxy, adhesives or curable polymers or melts. Alternative means of fabricating a substrate in the milli or micro or nanoscale size range include 3D printing, cutting, milling, laser writing, and embossing.

In an embodiment, a first substrate is bonded to a second substrate so as to form a bottom of channel features and to form open-ended microchannels that include microchannels 104a-b, input light path 116, light collection paths 118a-c, and focusing fluid microchannels 122a-c. In an embodiment, substrate 102 is bonded to a flat surface of the same material as the cast substrate so that the index of refraction of the material is the same around the exterior of input light path 116 and light collection paths 118a-c. In an embodiment, substrate 102 and the flat surface were both made of PDMS and bonded by oxygen plasma treatment of both layers prior to placing them together. In another embodiment, the PDMS layers are bonded together using a layer of liquid PDMS between the layers to promote bond following heat treatment to cure the liquid PDMS. Other methods to form the enclosed channels include using an adhesive such as epoxy, double-sided tape, or a mechanical force provided by a device such as a clamp or vacuum pump.

In an embodiment, input light path 116 and light collection paths 118a-c are filled with an appropriate material such as an optical liquid or adhesive or matching fluid to produce total-internal reflection and carry light along input light path 116 and light collection paths 118a-c. Alternatively, input light path 116 and light collection paths 118a-c can be formed by modifying the optical properties of substrate 102, e.g. by chemical, thermal, or optical manipulation, such that these regions become capable of confining and transmitting light as a waveguide. As waveguides, input light path 116 and light collection paths 118a-c deliver excitation light to and collect output light from material in optical interrogation region 112 of microchannel 104. In an embodiment, input light path 116 and light collection paths 118a-c are filled with PDMS that has a higher crosslinker ratio (e.g. 1:5). In an embodiment, the material filling input light path 116 and light collection paths 118a-c was a UV curable optical adhesive (e.g., commercially available as Norland Optical Adhesive 88), which has a higher index of refraction compared to PDMS.

In an embodiment, a process for making flow cytometer 100 includes incorporating an optical fiber to communicate excitation light from light source 114 to input light path and communicate output light to each of optical detectors 120a-c from light collection paths 118a-c. In an embodiment, the height of channels for input light path 116 and light collection paths 118a-c were set to match the diameter of bare fiber (e.g., 125 micrometers), and the width at the entrance of the light path channel where the fiber is inserted is set to be a small factor (e.g., 3 times) larger than the diameter of the fiber (roughly 300 micrometers) to facilitate fiber insertion. In an embodiment, the width of the light path channel tapers down to the width of the fiber or narrower to stop the fiber insertion at a certain point. In an embodiment, the width of the light path was narrowed further (e.g., 100 micrometers wide) to pinpoint the light impinging on the flow member or widened (e.g. 150 um) to collect more light from the flow member. Following insertion of stripped and cleaved optical fibers into input light path 116 and light collection paths 118*a-c*, the coupling fluid was cured with ultraviolet light or heat to lock the fibers in place. In an embodiment, SMA-pigtailed optical fibers were directly connected to lasers fitted with SMA adapters.

Waveguides can be solid, and light can be launched into input light path 116 and light collection paths 118*a-c* by gluing fibers to the ends of input light path 116 and light collection paths 118*a-c* or focusing light into input light path 116 and light collection paths 118*a-c* using optical elements. Waveguides can be an emission waveguide, a scattered light waveguide, a light obscuration waveguide, or a combination including at least one of the foregoing types of light paths.

In an embodiment, light blocking structures are disposed in substrate 102 and light from one path interacting with light from another path. In an embodiment, additional microchannels were placed between light paths and filled with an opaque liquid material (e.g., opaque or black PDMS, commercially available from Dow Corning under the tradename Sylgard 170) to prevent light from one feature leaking into and contaminating the light in another feature. The opaque PDMS was cured with heat.

The process for making flow cytometer 100 can include creating ports to deliver fluid to microchannel 104*a-b*. Creation of ports can involve cutting, boring, milling, etching, and the like. Ports, adapters, or fluid reservoirs can also be glued, clamped or affixed to microchannel 104*a-b* to communicate fluids with flow cytometer 100. In an embodiment, ports were created by boring or punching a hole through PDMS using a biopsy punch having a diameter of about 750 micrometer. In an embodiment, 21-gauge stainless steel tubing blunted at both ends was inserted into ports to connect to syringe pumps using flexible tubing having inner diameter similar to or slightly smaller than the outer diameters of the steel inserts.

An apparatus in accordance with embodiments of the present invention has several advantages and unexpected benefits and uses over previous flow cytometry apparatus. More particularly, embodiments of the present invention can be used for: improving uncertainty of fluorescent biomarkers and reducing detection limits; characterizing inhomogeneity of fluorescent markers or reagents in cells, particles, or droplets; detecting changes in object shape due to deformation (and subsequently enabling error correction in traditional measurements); improving counting statistics through repeat measurements; improving separation of coincident or overlapping particles; improving detection thresholds for rare objects; and using measurements to test and modify structures and control parameters (e.g. flow rates and particle concentrations) in order to achieve or improve on best-case performance. Embodiments of the present invention can be used to measure fluorogenic or fluoro-destructive reactions in small droplets containing specific reagents. Sequential measurements as each droplet, particle, or cell traverse along the channel can be used to determine a reaction rate. Embodiments of the present invention can also be used to detect enzymatic activity, signaling events, or more broad activity denoted by changes in fluorescent signals inside or outside of cells. Measurement of single cells can then be used to determine concentration or composition of signal within single cells to understand a population of particles or to characterize the response of particles within a sample population to a treatment condition. More particularly, embodiments of the present invention can also be used to detect antigen binding to chimeric antigen receptor (CAR) T cells that have been loaded with a calcium-sensitive fluorophore. When the antigen binds its receptor on the cell surface, several measurement regions distributed along the flow channel can be used to reconstruct the fluorescence increase due to calcium flux following the binding event. This also enables testing of drugs that interfere with calcium signaling or alter antigen discrimination.

Reference now to the specific examples which follow will provide a clearer understanding of systems in accordance with embodiments of the present invention. The examples should not be construed as a limitation upon the scope of the present invention.

Figure 14:
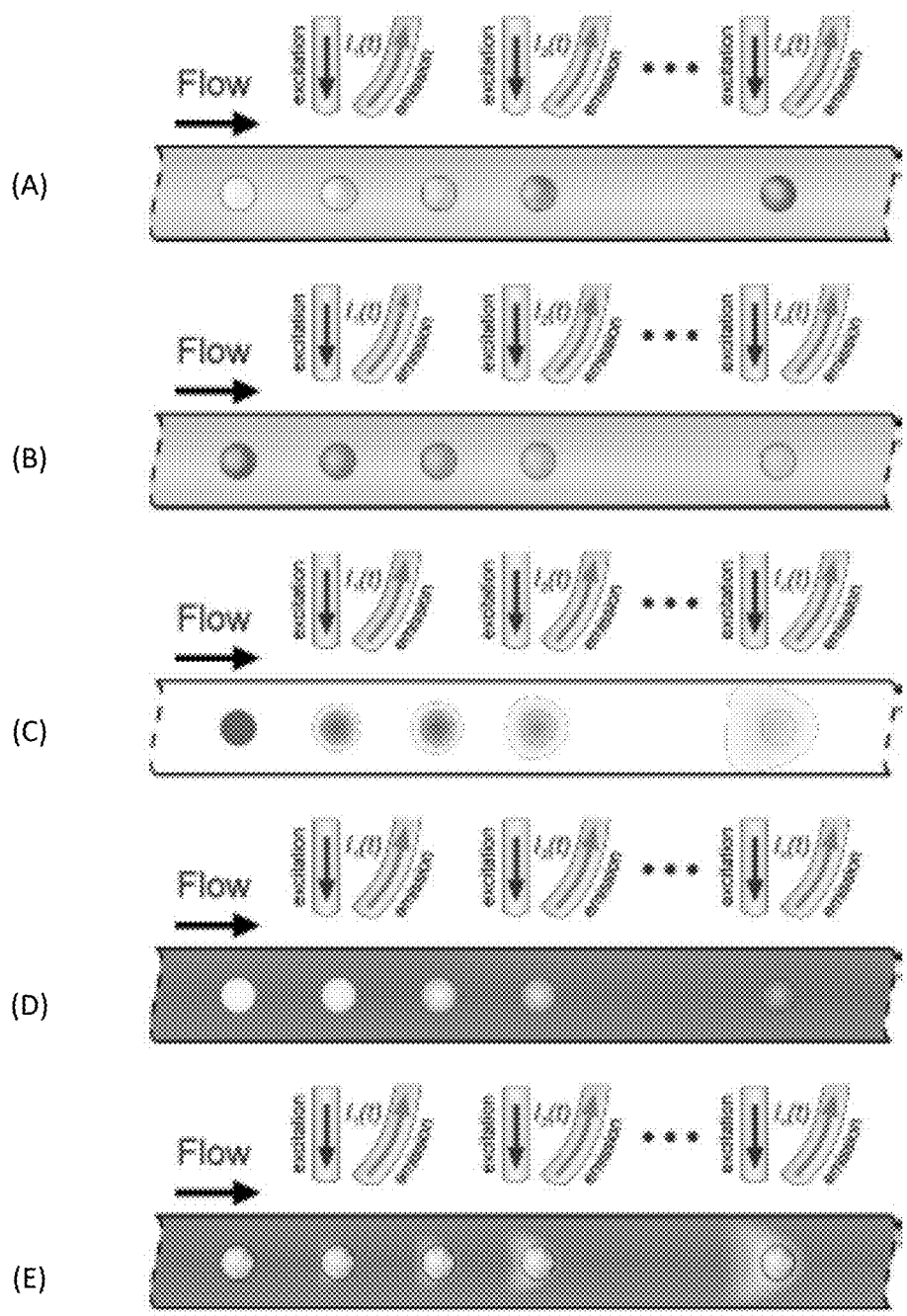
FIG. 14 illustrates exemplary time-dependent measurement modes and analyses that can be employed in embodiments of the present invention.

FIG. 14 illustrates exemplary time-dependent measurement modes that can be employed in embodiments of the present invention. FIG. 14 (A) (Panel 1 (top)) shows time dependent production of a fluorescent material as a micro-droplet-confined-reaction moves through the flow system. This scenario also encompasses activation of fluorescence indicators inside of a cell due to some triggering event. An example of this would be calcium influx and activation of a calcium sensitive dye. FIG. 14 (B) shows a reaction that is degrading fluorescent signal with time along the channel. FIG. 14 (C) illustrates a feature that could be measured as, for example, a leaky droplet or drug-containing vesicle or active cell expels a fluorescent marker out of its interior. FIG. 14 (D) illustrates uptake of fluorescent material by a particle such as a cell. FIG. 14 (E) illustrates consumption of fluorescent material (e.g. fluorescent food source) material around a cell as it travels along the flow path.

Figure 15:
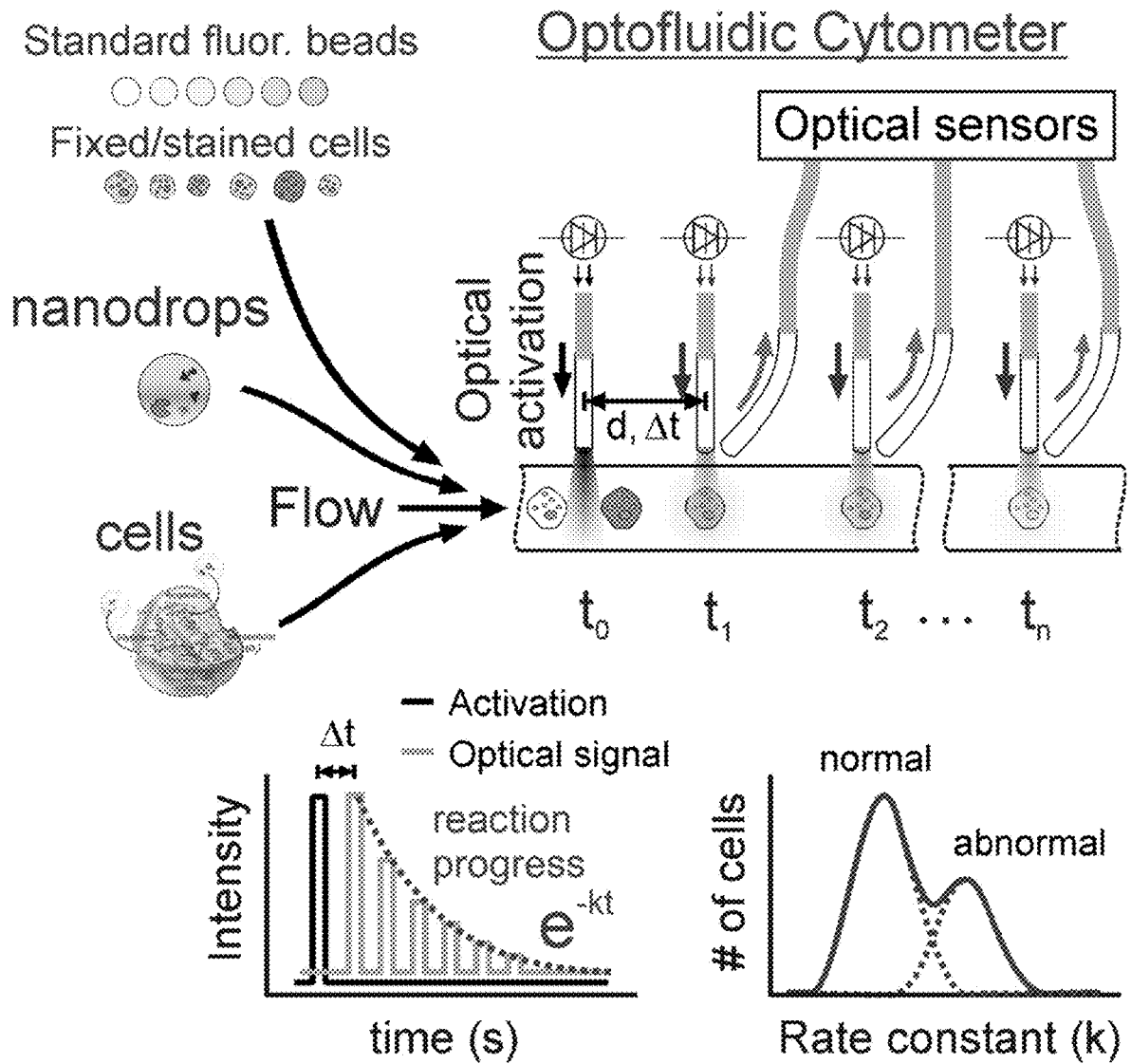
FIG. 15 illustrates exemplary measurements of fluorescent objects, such as microbeads, cells, and vesicles, from repeated measurements using a flow cytometer in accordance with an embodiment of the present invention.

FIG. 15 shows how different measurements of time-dependent behavior can be utilized to characterize a population of objects, e.g. living cells, in time through a flow channel. For example, fluorescent beads or droplets containing chemical reactions can be monitored in time as they move through the microchannel. For each object, the fluorescence intensity can be measured at different measurement regions in order to estimate the progress of a fluorogenic chemical reaction. As illustrated in FIG. 14, measurements of fluorescence degradation following activation signal can be tracked in time to estimate reaction rates for individual cells, which can then be used, for example, to distinguish normal reaction rates in cells to those in cancer cells (red traces in rate constant histograms) or to evaluate a population response to a putative drug.

FIGS. 11 and 12 illustrate exemplary measurements of fluorescent beads from four repeated measurements using a microfluidic cytometer in accordance with an embodiment of the present invention. The measurements in FIG. 12 show that the microfluidic cytometer can match or beat estimates of the coefficient of variation of microparticle intensity (<10%) compared to a traditional flow cytometer (10.5%, not shown) and that when considered in combination (FIG. 11), the replicate measurements enable never-before achieved uncertainties of each object in flow on the order to 2.5% or smaller coefficient of variation in normalized intensity across all 4 replicate measurements.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A flow cytometer, comprising:
   a substrate;
   a fluid inlet configured to receive a sample fluid comprising a plurality of particles;
   a first microchannel disposed on the substrate, wherein the first microchannel is configured to receive the sample fluid comprising the plurality of particles from the fluid inlet;
   a fluid outlet configured to allow the sample fluid to exit the substrate;
   a second microchannel disposed on the substrate in a plane parallel to a plane of the first microchannel such that a proximal end of the second microchannel aligns with a distal end of the first microchannel, wherein the second microchannel receives the sample fluid comprising the plurality of particles from the first microchannel, wherein the second microchannel is configured to convey the sample fluid received from the first microchannel to the fluid outlet;
   a plurality of fluid focusing microchannels intersecting the second microchannel, wherein each of the plurality of fluid focusing microchannels conveys a focusing fluid to the second microchannel such that the plurality of particles in the sample fluid is focused to form a substantially axially aligned particle stream; and
   a plurality of measurement regions configured to detect at least one of the plurality of particles being conveyed in the second microchannel, wherein each of the plurality of measurement regions comprises:
      an interrogation region positioned downstream from the plurality of fluid focusing microchannels, wherein the interrogation region receives at least one of the plurality of particles conveyed in the substantially axially aligned particle stream in the focused sample fluid;
      an input light path disposed in the substrate to propagate an excitation light to the interrogation region, wherein the excitation light interacts with the at least one of the plurality of particles received in the interrogation region to produce an output light; and
      a first light collection path to propagate the output light from the interrogation region to a first optical detector, wherein the first light collection path is positioned at an oblique angle or right angle to the second microchannel and proximate to the interrogation region, wherein the first optical detector is positioned perpendicular to an axis traversing the substrate, and wherein a detecting surface of the first optical detector is positioned opposing a first surface of the substrate; and
      a second optical detector positioned perpendicular to the axis traversing the substrate, wherein a detecting surface of the second optical detector is positioned opposing a second surface of the substrate.

2. The flow cytometer of claim 1, wherein each of the plurality of measurement regions further comprises:
   a second light collection path to propagate the output light from the interrogation region to the second optical detector, wherein the second light collection path is positioned above the input light path and at an oblique angle or right angle to the second microchannel and proximate to the interrogation region; and
   a third light collection path to propagate the output light from the interrogation region to a third optical detector, wherein the third light collection path is positioned below the input light path and at an oblique angle or right angle to the second microchannel and proximate to the interrogation region.

3. The cytometer of claim 1, further comprising a mirror positioned perpendicular to the axis traversing the substrate, wherein the mirror is positioned opposing a second surface of the substrate.

4. The cytometer of claim 1, wherein the excitation light is amplitude modulated.

5. The flow cytometer of claim 1, further comprising a flow controller in fluid communication with the fluid inlet and the plurality of fluid focusing microchannels, wherein the fluid controller controls the flow rate of the sample fluid to the fluid inlet, and wherein the fluid controller controls the flow rate of focusing fluid in the fluid focusing microchannels.

6. The flow cytometer of claim 1, wherein each of the plurality of fluid focusing microchannels forms a fluid focusing region in the second microchannel, and wherein each of the fluid focusing regions is configured to focus the sample fluid into a stream in one of a first vertical direction, a second vertical direction, and at least one horizontal direction.

7. The flow cytometer of claim 6, wherein the focusing of the sample fluid stream in the first vertical direction comprises pushing the sample fluid in an upward direction, wherein the focusing of the sample fluid in the second vertical direction comprises pushing the sample fluid in a downward direction to position the sample fluid at about the center of the second microchannel, and wherein the focusing of the sample fluid in the at least one horizontal direction comprises pushing the sample fluid away from at least one sidewall of the second microchannel.

8. The flow cytometer of claim 2, wherein the first, second and third light collection paths of the plurality of measurement regions is positioned symmetrically about a plane traversing the interrogation region of each of the plurality of measurement regions.

9. The flow cytometer of claim 2, wherein the input light path and the first, second and third light collection paths independently comprise a waveguide.

10. The flow cytometer of claim 1, wherein the first output light further comprises emitted light, scattered light, transmitted light, or a combination comprising at least one of the foregoing types of light.

11. The flow cytometer of claim 2, further comprising:
a collimating optical element arranged to project uniform light into the interrogation region; and
an optical filter optically interposed between each of the first, second and third light collection paths and each of the first, second and third optical detector.

12. The flow cytometer of claim 11, further comprising an analyzing module configured to extract a three-dimensional morphology parameter of each of the plurality of particles from a spatially coherent distribution of the output light received by the first, second and third optical detectors.

13. A flow cytometer, comprising:
a substrate;
a fluid inlet configured to receive a sample fluid comprising the plurality of particles;
a first microchannel disposed on the substrate, wherein the first microchannel is configured to receive the sample fluid comprising the plurality of particles from the fluid inlet;
a fluid outlet configured to allow the sample fluid to exit the substrate; and
a second microchannel disposed on the substrate in a plane parallel to a plane of the first microchannel such that a proximal end of the second microchannel aligns with a distal end of the first microchannel, wherein the second microchannel receives the sample fluid comprising the plurality of particles from the first microchannel, wherein the second microchannel is configured to convey the sample fluid received from the first microchannel to the fluid outlet;
a first, second and third fluid focusing microchannels positioned to intersect the second microchannel at an oblique angle, wherein the first fluid focusing microchannel is positioned in a plane that is substantially in the plane of and at the proximal end of the second microchannel, wherein the second fluid focusing microchannel is positioned in a plane that is above the plane of the second microchannel, wherein the third fluid focusing microchannel is positioned in a plane that is substantially in the plane of the second microchannel, wherein each of the first, second and third fluid focusing microchannels forms a fluid focusing region at the second microchannel such that each of the fluid focusing region comprises a vertical fluid focusing feature or a horizontal fluid focusing feature configured to focus the sample fluid to an inertial node within the second microchannel;
a plurality of measurement regions configured to detect at least one of the plurality of particles being conveyed in the second microchannel, wherein each of the plurality of measurement regions comprises:
an interrogation region positioned downstream from the plurality of fluid focusing microchannels, wherein the interrogation region receives at least one of the plurality of particles conveyed in the focused sample fluid; and
an input light path disposed in the substrate to propagate an excitation light to the interrogation region, wherein the excitation light interacts with the at least one of the plurality of particles received in the interrogation region to produce an output light;
a first optical detector positioned opposing a first surface of the substrate, wherein the first optical detector receives the output light exiting from the first surface of the substrate; and
a mirror positioned opposing a second surface of the substrate such that the substrate is arranged between the mirror and the first optical detector, wherein the mirror reflects the output light exiting from the second surface of the substrate, and wherein the first optical detector receives the reflected output light.

14. The flow cytometer of claim 13, further comprising a flow controller in fluid communication with the fluid inlet and the plurality of fluid focusing microchannels, wherein the fluid controller controls the flow rate of the sample fluid to the fluid inlet, and wherein the fluid controller controls the flow rate of focusing fluid in the fluid focusing microchannels.

15. The flow cytometer of claim 13, wherein the fluid focusing regions formed by the first and the second fluid focusing microchannels comprise the vertical feature, wherein the fluid focusing region formed by the third fluid focusing microchannel comprises the horizontal feature, wherein the first fluid focusing microchannel is positioned between the fluid inlet and the third fluid focusing microchannel, wherein the third fluid focusing microchannel is positioned between the first fluid focusing microchannel and the second fluid focusing microchannel, and the second fluid focusing microchannel is positioned between the third fluid focusing microchannel and the measurement region.

16. The flow cytometer of claim 13, wherein the fluid focusing regions formed by the first and the second fluid focusing microchannels comprise the vertical feature, wherein the fluid focusing region formed by the third fluid focusing microchannel comprises the horizontal feature, wherein the first fluid focusing microchannel is positioned between the fluid inlet and the second fluid focusing microchannel, wherein the second fluid focusing microchannel is positioned between the first fluid focusing microchannel and the third fluid focusing microchannel, and the third fluid focusing microchannel is positioned between the second fluid focusing microchannel and the measurement region.

17. The flow cytometer of claim 13, wherein each of the input light path and the first, second and third light collection paths comprises a waveguide.

18. A flow cytometer, comprising:
a substrate;
a fluid inlet configured to receive a sample fluid comprising the plurality of particles;
a first microchannel disposed on the substrate, wherein the first microchannel is configured to receive a sample fluid comprising a plurality of particles from the fluid inlet;
a fluid outlet configured to allow the sample fluid to exit the substrate;

a second microchannel disposed on the substrate in a plane parallel to a plane of the first microchannel such that a proximal end of the second microchannel aligns with a distal end of the first microchannel, wherein the second microchannel is configured to convey the sample fluid from the first microchannel to the fluid outlet;

a first, second and third fluid focusing microchannels positioned at an angle to the second microchannel, wherein the first fluid focusing microchannel is positioned between the fluid inlet and the second fluid focusing microchannel in a plane that is substantially in a plane of the second microchannel, wherein the second fluid focusing microchannel is positioned between the first fluid focusing microchannel and the third fluid focusing microchannel in a plane that is parallel to the plane of the first microchannel, wherein the third fluid focusing microchannel is positioned between the second fluid focusing microchannel and the measurement region in a plane that is substantially in the plane of the second microchannel, wherein each of the first, second and third fluid focusing microchannels is configured to convey focusing fluid therethrough, wherein focusing fluid in the first fluid focusing microchannels push the sample fluid in a first vertical direction to focus the sample fluid into a stream positioned along a top wall of the second microchannel, wherein focusing fluid in the second fluid focusing microchannels push the focused sample fluid stream in a second vertical direction to position the focused sample fluid stream at about the center of the second microchannel, and wherein focusing fluid in the third fluid focusing microchannels push the sample fluid in a horizontal direction away from at least one sidewall of the second microchannel;

a plurality of measurement regions configured to detect at least one of the plurality of particles being conveyed in the second microchannel, wherein each of the plurality of measurement regions comprises:
 an interrogation region positioned downstream from the plurality of fluid focusing microchannels, wherein the interrogation region receives at least one of the plurality of particles conveyed in the focused sample fluid; and
 an input light path disposed in the substrate to propagate an excitation light to the interrogation region, wherein the excitation light interacts with the at least one of the plurality of particles received in the interrogation region to produce an output light;

a first optical detector is positioned opposing a first surface of the substrate, wherein the first optical detector receives the output light exiting from the first surface; and a second optical detector positioned opposing a second surface of the substrate such that the substrate is arranged between the first and second optical detectors, wherein the second optical detector receives the output light exiting from the second surface of the substrate.

* * * * *